(12) United States Patent
Liu et al.

(10) Patent No.: US 11,955,865 B2
(45) Date of Patent: Apr. 9, 2024

(54) THREE-AXIS VOICE COIL MOTOR

(71) Applicant: National Cheng-Kung University, Tainan (TW)

(72) Inventors: Chien-Sheng Liu, Tainan (TW); Yi-Hsuan Lin, Keelung (TW); Chiu-Nung Yeh, Kaohsiung (TW)

(73) Assignee: National Cheng-Kung University, Tainan (TW)

( * ) Notice: Subject to any disclaimer, the term of this patent is extended or adjusted under 35 U.S.C. 154(b) by 207 days.

(21) Appl. No.: 17/504,520

(22) Filed: Oct. 19, 2021

(65) Prior Publication Data
US 2023/0080656 A1 Mar. 16, 2023

(30) Foreign Application Priority Data
Sep. 15, 2021 (TW) .................................. 110134306

(51) Int. Cl.
*H02K 41/035* (2006.01)
*H02K 1/06* (2006.01)
(52) U.S. Cl.
CPC ........... *H02K 41/0356* (2013.01); *H02K 1/06* (2013.01); *H02K 2201/18* (2013.01)
(58) Field of Classification Search
CPC .. H02K 41/0356; H02K 1/06; H02K 2201/18; H02K 41/0358
See application file for complete search history.

(56) References Cited

U.S. PATENT DOCUMENTS 8,080,911 B2 12/2011 Won et al.

FOREIGN PATENT DOCUMENTS

| JP | 2008061397 A | * | 3/2008 | ............ H02K 15/03 |
| JP | 2011217540 A | * | 10/2011 | |
| KR | 101372392 B1 | * | 3/2014 | |
| TW | I617116 | | 3/2018 | |

OTHER PUBLICATIONS

KR-101372392-B1_translate (Year: 2014).*
JP-2011217540-A_translate (Year: 2011).*
JP-2008061397-A_translate (Year: 2008).*

(Continued)

*Primary Examiner* — Tulsidas C Patel
*Assistant Examiner* — Mohammed Ahmed Qureshi
(74) *Attorney, Agent, or Firm* — JCIPRNET

(57) ABSTRACT

A three-axis voice coil motor including a base, a spherical bearing, a magnetic component, an X-coil group, a Y-coil group, and at least one Z-coil group is provided. The base has a supporting pole. The spherical bearing is rotatably sleeved around the supporting pole. The magnetic component is securely sleeved around the spherical bearing and the magnetic component rotates along with the spherical bearing. The X-coil group is disposed around the magnetic component along an X-axial direction passing through the spherical bearing, and the X-coil group has first gaps. The Y-coil group is disposed around the magnetic component along a Y-axial direction passing through the spherical bearing, and the Y-coil group has second gaps. The Z-coil group is disposed around the magnetic component along a Z-axial direction passing through the spherical bearing.

18 Claims, 17 Drawing Sheets

(56) References Cited

OTHER PUBLICATIONS

Quan-Wei Wu, "Integral Terminal Sliding-Mode Control for Three-Axis VCMs-based Positioning Stage", Thesis of Master Degree, National Taiwan Normal University, Aug. 2017, with English abstract, pp. 1-105.

Yi-Hsuan Lin et al., "Design and Simulation of Novel 3-DOF Spherical Voice Coil Motor", Actuators, vol. 10, Jul. 2021, pp. 1-13.

Chien-Sheng Liu et al., "Analytical Investigation on Torque of Three-Degree-of-Freedom Electromagnetic Actuator for Image Stabilization", Appl. Sci., vol. 11, Jul. 2021, pp. 1-14.

Akira Heya et al., "Dynamic Analysis of a New Three-Degree-of-Freedom Actuator for Image Stabilization", IEEE Transactions on Magnetics, Jun. 2017, pp. 1.

Akira Heya et al., "Dynamic Modeling and Control of Three-Degree-of-Freedom Electromagnetic Actuator for Image Stabilization", IEEE Transactions on Magnetics, vol. 54, Issue 11, Nov. 2018, pp. 1-5.

Hyunchang Kim et al., "Design of a new type of spherical voice coil actuator", Sensors and Actuators A: Physical, vol. 203, Aug. 2013, pp. 181-188.

Chang-Lin Hsieh, et al., "Design of a 5 degree of freedom-voice coil motor actuator for smartphone camera modules", Sensors and Actuators A: Physical, vol. 309, May 2020, pp. 1-13.

Chang-Lin Hsieh et al., "Design of VCM actuator with the chamfered edge magnet for cellphone", Microsyst Technol, vol. 23, Feb. 2017, pp. 5293-5302.

Yu-Hao Chang et al., "Open-Loop Control of Voice Coil Motor With Magnetic Restoring Force Using High-Low Frequency Composite Signals", IEEE Access, vol. 7, Oct. 2019, pp. 146258-146263.

Chang-Lin Hsieh et al., "Design of VCM actuator with L-shape coil for smartphone cameras", Microsyst Technol, vol. 24, Issue 2, May 2017, pp. 1-8.

Chang-Lin Hsieh et al., "Design of a Voice Coil Motor Actuator With L-Shape Coils for Optical Zooming Smartphone Cameras", IEEE Access, vol. 8, Jan. 2020, pp. 20884-20891.

Yu-Hao Chang et al., "Design of VCM actuator for optical zooming smartphone cameras", Microsystem Technologies, vol. 25, May 2018, pp. 1-5.

* cited by examiner

THREE-AXIS VOICE COIL MOTOR

CROSS-REFERENCE TO RELATED APPLICATION

This application claims the priority benefit of Taiwanese application no. 110134306, filed on Sep. 15, 2021. The entirety of the above-mentioned patent application is hereby incorporated by reference herein and made a part of this specification.

BACKGROUND

Technology Field

The disclosure relates to a voice coil motor, and particularly, to a three-axis voice coil motor with multi-degree-of-freedom control.

Description of Related Art

To achieve multi-degree-of-freedom control, mechanisms, such as robotic arms and lenses usually use a combination of multiple one-degree-of-freedom motors to attain the purpose of multi-degree-of-freedom movement. However, the current combination of multiple motors may lead to a bulky mechanism and disadvantages of low operating efficiency, slow response speed, and inaccurate positioning. Nowadays, a voice coil motor has been developed, which has the characteristics of fast response speed and high accuracy. In the voice coil motor, by changing the current passing through the coil, the magnetic structure is driven to rotate in different directions to achieve multi-degree-of-freedom control. However, when the very voice coil motor rotates at a large angle, a coil with no magnetic field passing through may not be used, resulting in power waste and even hindering the control of the rotation of the magnetic structure.

SUMMARY

The disclosure provides a three-axis voice coil moto in which coils of different axial directions are divided to form gaps. By supplying power to specific coils to achieve high-efficiency driving, the rotation stroke of the three-axis voice coil motor may also be increased.

A three-axis voice coil motor of the disclosure includes a base, a spherical bearing, a magnetic component, an X-coil group, a Y-coil group, and a Z-coil group. The base has a supporting pole. The spherical bearing is rotatably sleeved around the supporting pole. The magnetic component is securely sleeved around the spherical bearing and rotates along with the spherical bearing. The X-coil group is disposed around the magnetic component along an X-axial direction passing through the spherical bearing, and the X-coil group has a plurality of first gaps. The Y-coil group is disposed around the magnetic component along a Y-axial direction passing through the spherical bearing, and the Y-coil group has a plurality of first gaps. The Z-coil group is disposed around the magnetic component along a Z-axial direction passing through the spherical bearing. When a current is supplied to the X-coil group, the Y-coil group, or the Z-coil group and when a magnetic field of the magnetic component is propagated to the X-coil group, the Y-coil group, or at least one Z-coil group, a corresponding Lorentz force may be generated to drive the magnetic component to rotate along the X-axial direction, the Y-axial direction, or the Z-axial direction rotation on the spherical bearing.

In summary, the three-axis voice coil motor of the disclosure adopts an X-coil group and a Y-coil group that are divided, which have a first gap and a second gap, respectively. The X-coil group and the Y-coil group are adapted for increasing high-efficiency rotation through different power supply arrangements along with the magnetic field distribution of the magnetic component. In detail, the three-axis voice coil motor of the disclosure is adapted for being powered on where the magnetic field strength is high in the X-coil group and the Y-coil group, and not being powered on where the magnetic field is low in the X-coil group and the Y-coil group, and thereby the electromagnetic efficiency is optimized.

DESCRIPTION OF THE EMBODIMENTS

Figure 1A:
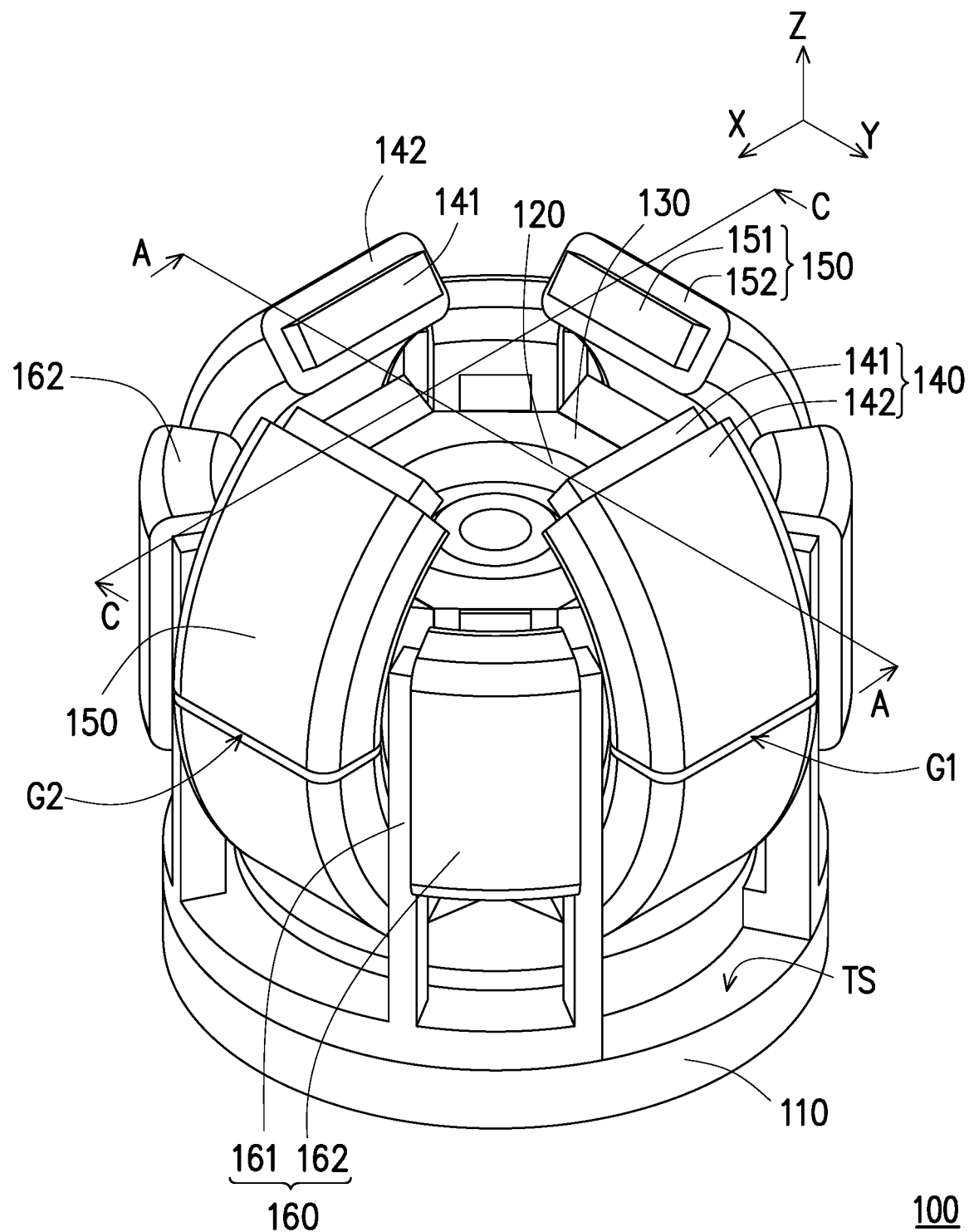
FIG. 1A is a three-dimensional schematic view of a three-axis voice coil motor according to an embodiment of the disclosure.
Figure 1B:
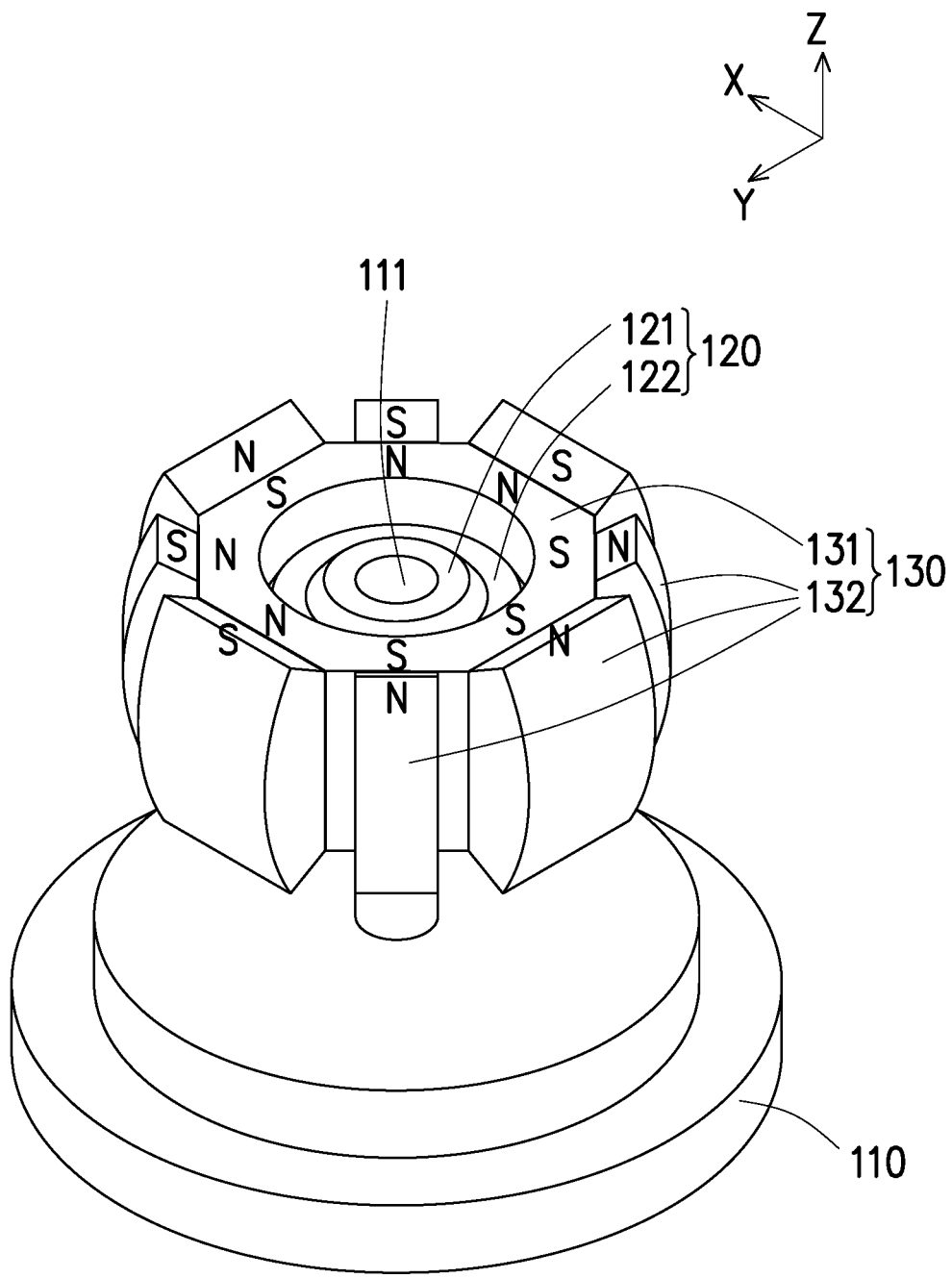
FIG. 1B is a three-dimensional schematic view of some components of the three-axis voice coil motor of FIG. 1A.
Figure 1C:
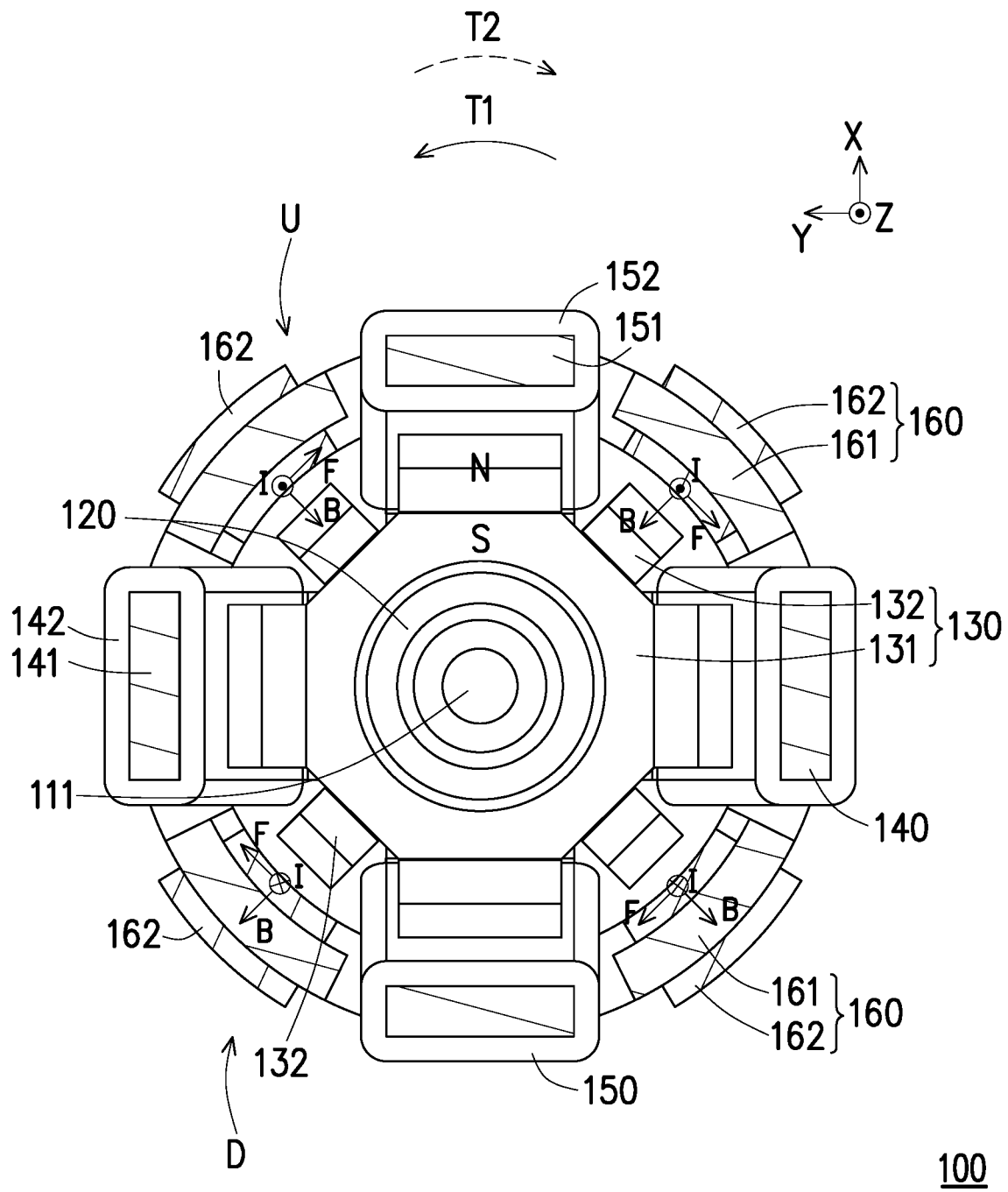
FIG. 1C is a schematic top sectional view of the three-axis voice coil motor in FIG. 1A.
Figure 1D:
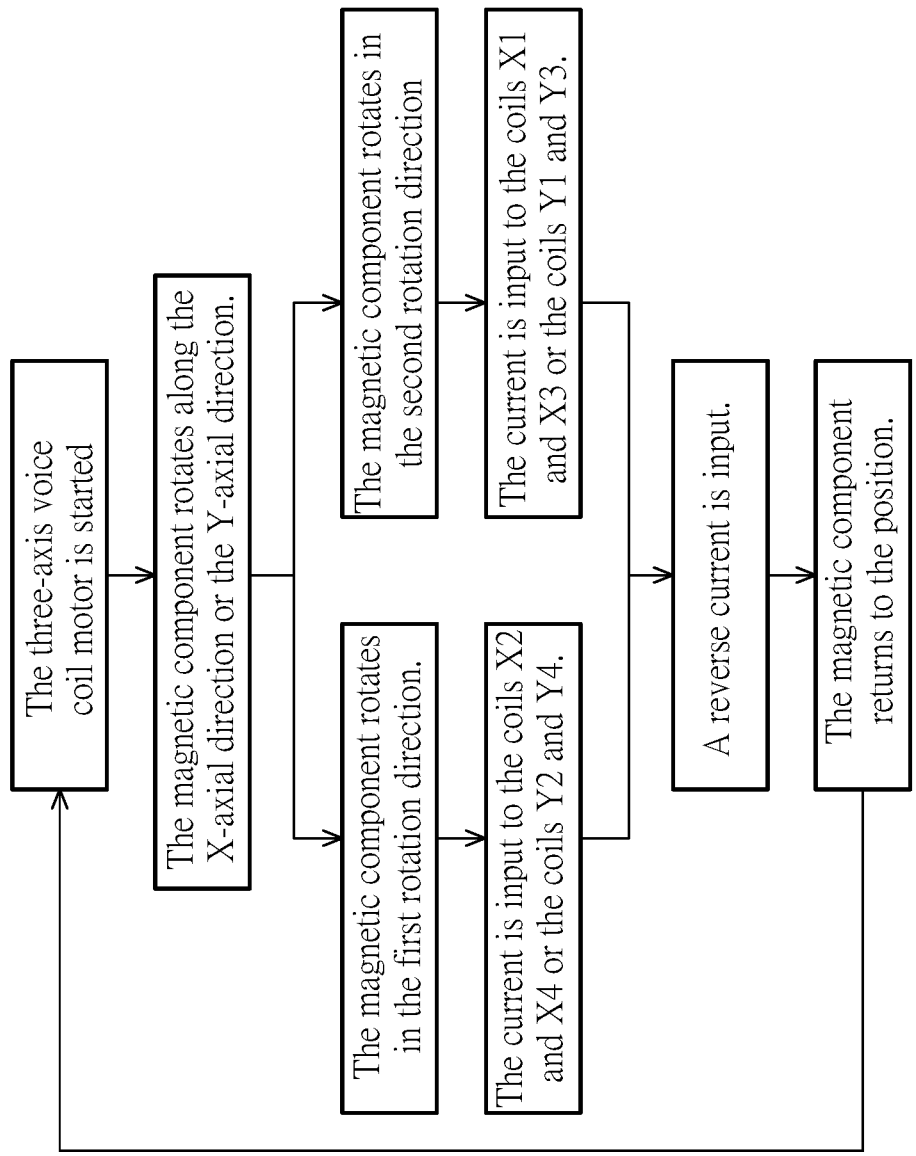
FIG. 1D is a block diagram of a rotation control of the three-axis voice coil motor in FIG. 1A in an X-axial direction or a Y-axial direction.

FIG. 1A is a three-dimensional schematic view of a three-axis voice coil motor according to an embodiment of the disclosure. FIG. 1B is a three-dimensional schematic view of some components of the three-axis voice coil motor of FIG. 1A. FIG. 1C is a schematic top sectional view of the three-axis voice coil motor in FIG. 1A. FIG. 1D is a block diagram of a rotation control of the three-axis voice coil motor in FIG. 1A in an X-axial direction or a Y-axial direction.

Referring to FIG. 1A, the three-axis voice coil motor of the disclosure is adapted for actuators of robotic arms, photographic lenses, or mechanical eyeballs to achieve multi-degree-of-freedom rotation control. Furthermore, the three-axis voice coil motor of the disclosure is capable of changing the combination of the power-on arrangement of the coils, and the disadvantage that currently the voice coil motor cannot effectively use all the coils when rotating at a large angle is overcome.

Referring to FIG. 1A to FIG. 1C, a three-axis voice coil motor 100 of the embodiment includes a base 110, a spherical bearing 120, a magnetic component 130, an X-coil group 140, a Y-coil group 150, and a Z-coil group 160.

The base 110 has a supporting pole 111. Specifically, the supporting pole 111 is disposed at the center of the top surface of the base 110, and the supporting pole 111 is perpendicular to the top surface of the base 110.

The spherical bearing 120 is rotatably sleeved around the supporting pole 111. The magnetic component 130 is securely sleeved around the spherical bearing 120 and rotates along with the spherical bearing 120. The X-coil group 140 is disposed around the magnetic component 130 along an X-axial direction passing through the spherical bearing 120, and the X-coil group 140 has multiple first gaps G1. The Y-coil group 150 is disposed around the magnetic component 130 along a Y-axial direction passing through the spherical bearing 120, and the Y-coil group 150 has multiple first gaps G2. The Z-coil group 160 is disposed around the magnetic component 130 along a Z-axial direction passing through the spherical bearing 120.

Figure 2A:
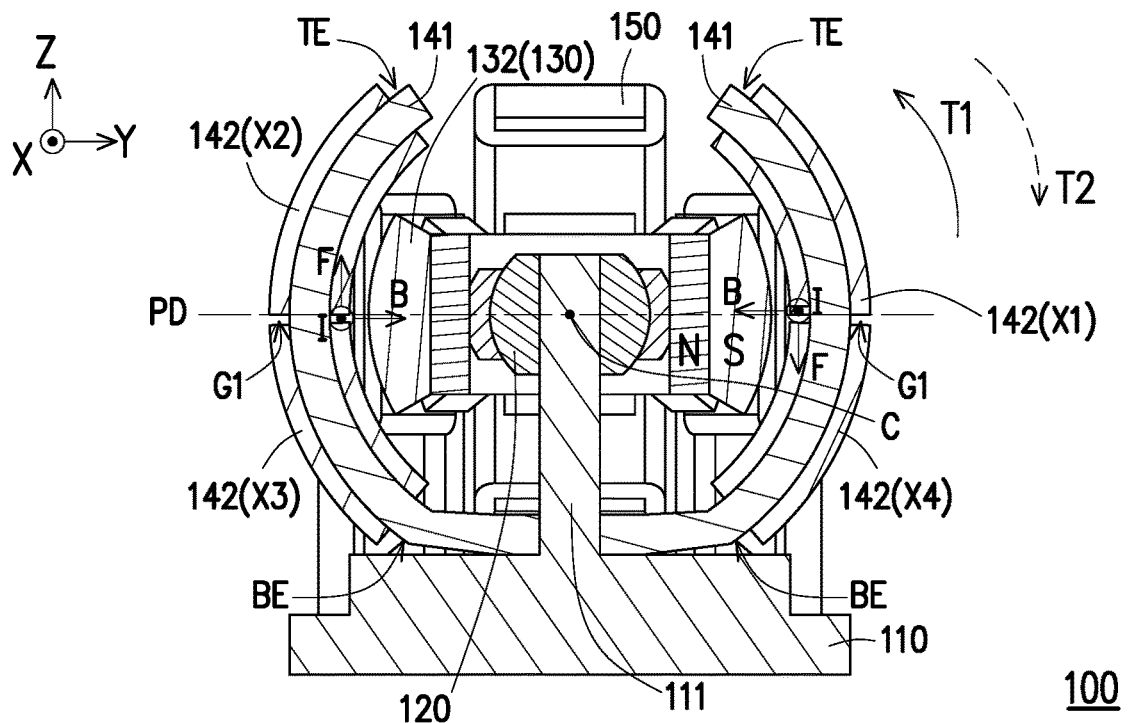
FIG. 2A is a schematic side sectional view of the three-axis voice coil motor in FIG. 1A taken along line A-A.
Figure 2B:
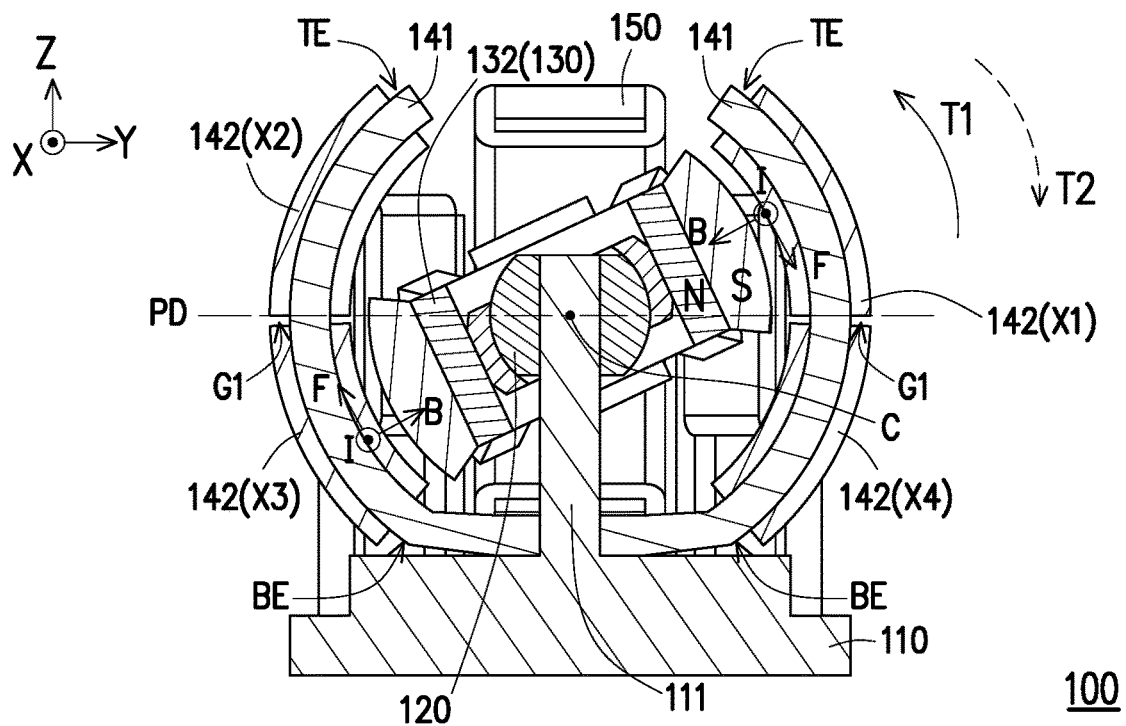
FIG. 2B is a side sectional view illustrating a rotating action of a magnetic component of the three-axis voice coil motor of FIG. 1A along the X-axial direction.

FIG. 2A is a schematic side sectional view of the three-axis voice coil motor in FIG. 1A taken along line A-A. FIG. 2B is a side sectional view illustrating a rotating action of a magnetic component of the three-axis voice coil motor of FIG. 1A along the X-axial direction. FIG. 2E is a schematic side sectional view of the three-axis voice coil motor in FIG. 1A taken along line C-C.

With reference to FIG. 1C, FIG. 2A, and FIG. 2B, when an current I is input to the X-coil group 140, the Y-coil group 150, or the Z-coil group 160 and when a magnetic field B of the magnetic component 130 is propagated to the X-coil group 140, the Y-coil group 150, or at least one Z-coil group 160, a corresponding Lorentz force F may be generated to drive the magnetic component 130 to rotate along the X-axial direction, Y-axial direction, or Z-axial direction on the spherical bearing 120.

Furthermore, referring to FIG. 2A and FIG. 2B, the spherical bearing 120 includes a first ring portion 121 and a second ring portion 122. The first ring part 121 is securely sleeved around the supporting pole 111, the second ring portion 122 is rotatably sleeved around the first ring portion 121, and the second ring portion 122 is adapted to rotate relative to the first ring portion 121 to drive the magnetic component 130 to rotate relative to the X-coil group 140, the Y-coil group 150, or the Z-coil group 160. Therefore, the magnetic component 130 has degrees of freedom of rotation control along at least three axial directions (X, Y, and Z). Furthermore, the magnetic component 130 can also rotate along an X-Y axial direction, an X-Z axial direction, or a Y-Z axial direction.

Referring to FIG. 1A to FIG. 1C, the magnetic component 130 of the embodiment has an inner yoke 131 and multiple magnetic blocks 132. The inner yoke 131 is securely sleeved around the second ring portion 122 of the spherical bearing 120, the magnetic blocks 132 are disposed around an outer surface OS of the inner yoke 131, and the magnetic blocks 132 are disposed at intervals.

Referring to FIG. 1A and FIG. 1C, the X-coil group 140 has two first yokes 141 and four X-coils 142. The two first yokes 141 are disposed on a top surface TS of the base 110 and located on opposite sides of the magnetic component 130. Two X-coils 142 (X1 and X2) respectively are disposed around a top end TE of the two first yokes 141. The other two X-coils 142 (X3 and X4) respectively are disposed around a bottom end BE of the two first yokes 141 and are spaced apart from the two X-coils 142 (X1 and X2) respectively to form multiple first gaps G1. The four X-coils 142 are electrically coupled to the two first yokes 141, respectively.

Referring to FIG. 1A, FIG. 1C, and FIG. 2E, the Y-coil group 150 has two second yokes 151 and four Y-coils 152. The two second yokes 151 are disposed on the base 110 and located on opposite sides of the magnetic component 130. Two Y-coils Y1 and Y2 respectively are disposed around a top end TE of the two second yokes 151. The other two Y-coils Y3 and Y4 respectively are disposed around a bottom end BE of the two second yokes 151 and are spaced apart from the two Y-coils Y1 and Y2 to form multiple second gaps G2. The four Y-coils 152 are electrically coupled to the two second yokes 151 respectively. In addition, the Y-coil group 150 and the X-coil group 140 are orthogonal to each other (refer to FIG. 1C).

Referring to FIG. 1C and FIG. 1A, at least one Z-coil group 160 has four third yokes 161 and four Z-coils 162. The third yokes 161 are disposed opposite to one another on the base 110 and coupled to one another, each third yoke 161 is disposed between each first yoke 141 and each second yoke 151, and each Z-coil 162 is disposed around each third yoke 161 and is located between each first gap G1 and each second gap G2. In addition, each Z-coil 162 is adjacent to the two X-coils 142 and the two Y-coils 152.

Referring to FIG. 1C and FIG. 1D, the rotation control results of the three-axis voice coil motor 100 in the X-axial direction, Y-axial direction, and Z-axial direction in the embodiment are illustrated in the subsequent paragraphs.

Figure 2C:
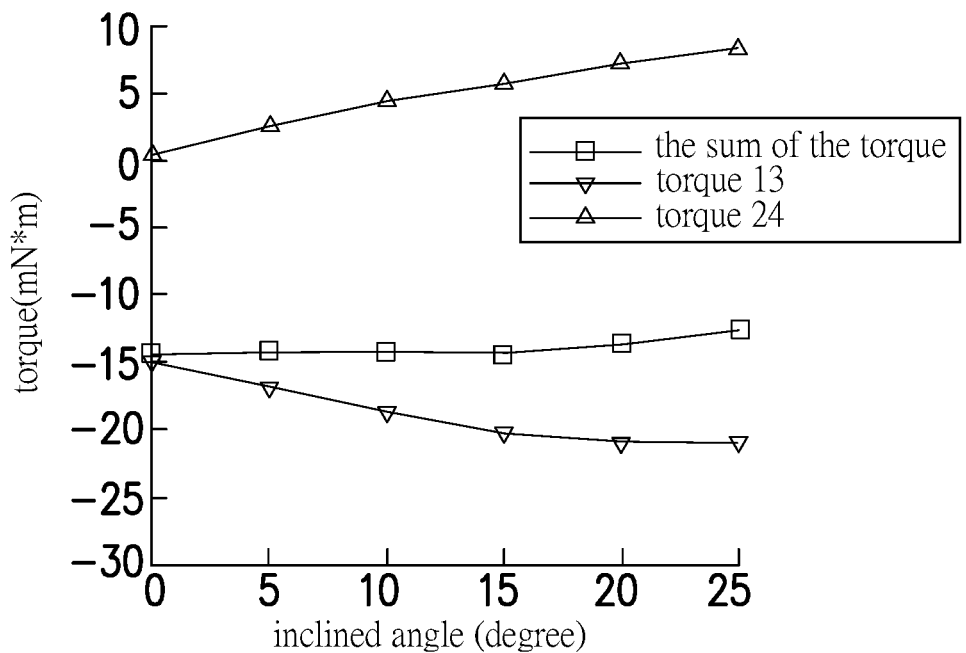
FIG. 2C illustrates the relationship between torque and an inclination angle when power is supplied to an X-coil group of three-axis voice coil motor of FIG. 2A.

FIG. 2C illustrates the relationship between torque and an inclination angle when power is supplied to an X-coil group of three-axis voice coil motor of FIG. 2A.

With reference to FIG. 2A and FIG. 2C, when the magnetic component 130 is along the X-axial direction, the current I is input to the four X-coils 142. The magnetic field B of the magnetic component 130 passes through the X-coil group 140 and is propagated along the X-coil group 140 toward a center point C of the magnetic component 130. Under the action of the four X-coils 142, a Lorentz force F may be generated and torque in a second rotation direction T2 may be formed for the magnetic component 130. Since the X-coil group 140 is a stator, the torque of the X-coil group 140 in a second rotation direction T2 may drive the magnetic component 130 to rotate in a first rotation direction T1 with the X-axial direction as the center.

With reference to FIG. 2E, when the magnetic component 130 rotates along the Y-axial direction, the current I is input to the four Y-coils 152. The magnetic field B of the magnetic component 130 passes through the Y-coil group 150 and is away from a center point C of the magnetic component 130. Under the action of the four Y-coils 152, a Lorentz force F may be generated and torque in the second rotation direction T2 may be formed for the magnetic component 130. Since the Y-coil group 150 is a stator, the torque generated by the Y-coil group 150 in the second rotation direction T2 may drive the magnetic component 130 to rotate in the first rotation direction T1 with the Y-axial direction as the center.

The magnetic component 130 rotating along the X-axial direction is illustrated as an example in the subsequent paragraphs, and the torque generated during the rotation of the magnetic component 130 is illustrated in detail.

Referring to FIG. 2C, the magnetic component 130 rotates along the X-axial direction toward the first rotation direction T1, within the scope from 0 degrees to 25 degrees, two X-coils 142 (X2 and X4) generate torque 24 of 0-10 (mN*m) in the first rotation direction T1, and the other two X-coils 142 (X1 and X3) generate torque 13 of 15-20 (mN*m) in the second rotation direction T2.

Referring to FIG. 2C, the sum of the torque 13 and the torque 24 is torque of 10-15 (mN*m) in the second rotation direction T2. This means that the torque 24 generated by the two X-coils 142 (X2 and X4) in the first rotation direction T1 hinders the rotation of the magnetic component 130 in the first rotation direction T1.

Figure 2D:
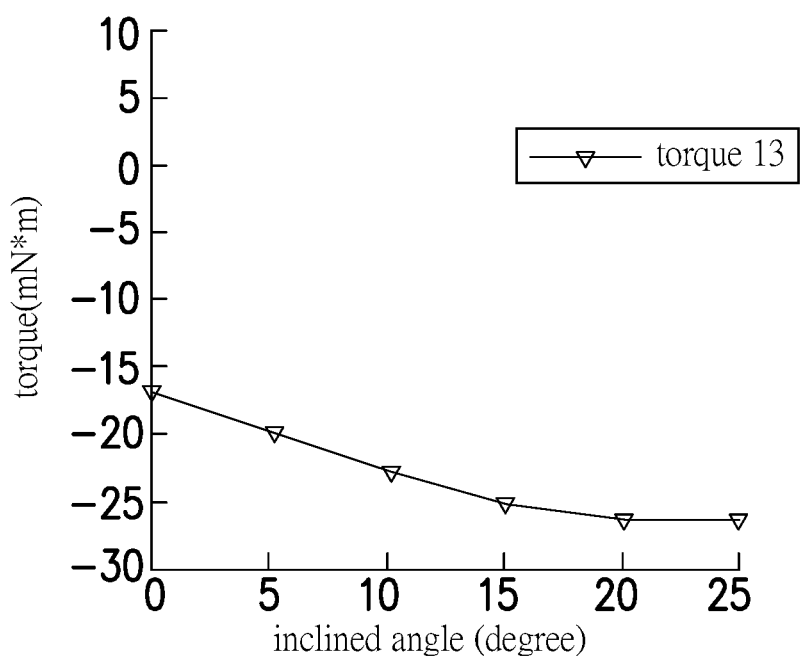
FIG. 2D illustrates the relationship between torque and an inclination angle when power is supplied to part of an X-coil group of the three-axis voice coil motor of FIG. 2B.
Figure 2E:
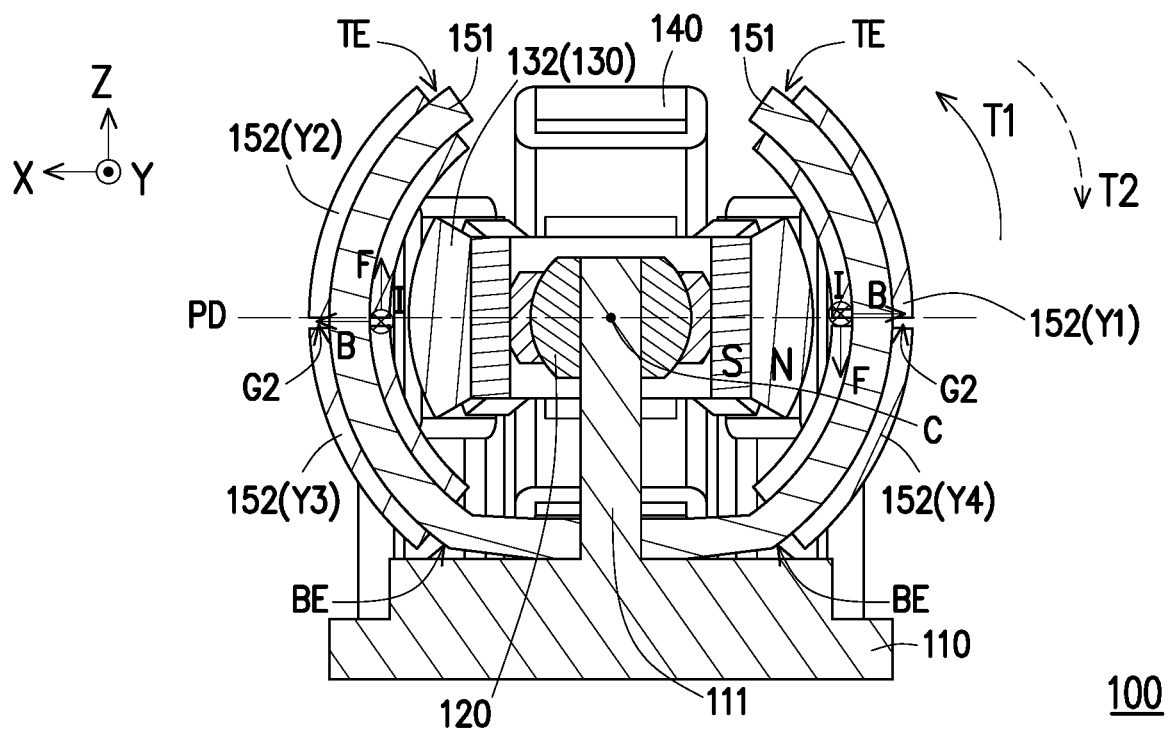
FIG. 2E is a schematic side sectional view of the three-axis voice coil motor in FIG. 1A taken along line C-C.

FIG. 2D illustrates the relationship between torque and an inclination angle when power is supplied to part of an X-coil group of the three-axis voice coil motor of FIG. 2B.

With reference to FIG. 1D, FIG. 2A, FIG. 2B, and FIG. 2D, when the current I is input to two corresponding X-coils 142 (X1 and X3), the magnetic field B passing through the two X-coils 142 (X1 and X3) of the X-coil group 140 is propagated toward a center point C of the magnetic component 130. This means that the current I is not input to the other two X-coils 142 (X2 and X4), that is, the power is not supplied to the two X-coils 142 (X2 and X4).

Under the interaction between the two power-on X-coils 142 (X1 and X3) and the magnetic field B, a corresponding Lorentz force F may be generated and torque in the second rotation direction T2 may be formed for the magnetic component 130. Since the X-coil group 140 is a stator, the torque generated by the X-coil group 140 in the second rotation direction T2 may drive the magnetic component 130 to rotate in the X-axial direction in the first rotation direction T1.

Referring to FIG. 2D, the magnetic component 130 rotates along the X-axial direction toward the first rotation direction T1, within the range from 0 degrees to 25 degrees, the two X-coils 142 (X2 and X4) do not input the current I, and no torque is generated, but the other two X-coils 142 (X1 and X3) input the current I to generate torque 13 of 16-25 (mN*m) in the second rotation direction T2. This means when the two X-coils 142 (X2 and X4) do not input the current I, the current I originally input to the two X-coils 142 (X2 and X4) is input into the two X-coils 142 (X1 and X3) to form an I that is $2(\sqrt{2})$ times the root number, and accordingly the torque output value of the other two X-coils 142 (X1 and X3) is increased, which further prevents the rotation of the magnetic component 130 from being hindered by the power-on two X-coils 142 (X2 and X4).

On the contrary, when the current I of $2(\sqrt{2})$ times is input into the corresponding two X-coils 142 (X2 and X4), the magnetic component 130 is driven to rotate in the second rotation direction T2 with the X-axial direction as the center. In actual use, the rotation stroke of the magnetic component 130 in the X-axial direction ranges between plus and minus 25 degrees.

Referring to FIG. 1C, when the magnetic component 130 rotates along the Z-axial direction, a forward current I is input into the two Z-coils 162 of the upper U, and the magnetic field B of the magnetic component 130 passes through the two Z-coils 162 of the upper U and is propagated toward the corresponding magnetic block 132. A reverse current I is input into the other two Z-coils 162 of the bottom D, and the magnetic field B of the magnetic component 130 is propagated toward the two Z-coils 162 of the bottom D. Under the interaction of the four Z-coils 162 and the magnetic field B, a Lorentz force F may be generated and torque in the second rotation direction T2 may be formed for the magnetic component 130. Since the Z-coil group 160 is a stator, the torque of the Z-coil group 160 in the second rotation direction T2 may drive the magnetic component 130 to rotate in the first rotation direction T1 with the Z-axial direction as the center.

On the contrary, changing the direction in which the current I is input to the Z-coils 162 can drive the magnetic component 130 to rotate in the second rotation direction T2 with the Z-axial direction as the center. In actual use, the rotation stroke of the magnetic component 130 in the Z-axial direction ranges between plus and minus 5 degrees.

Figure 3A:
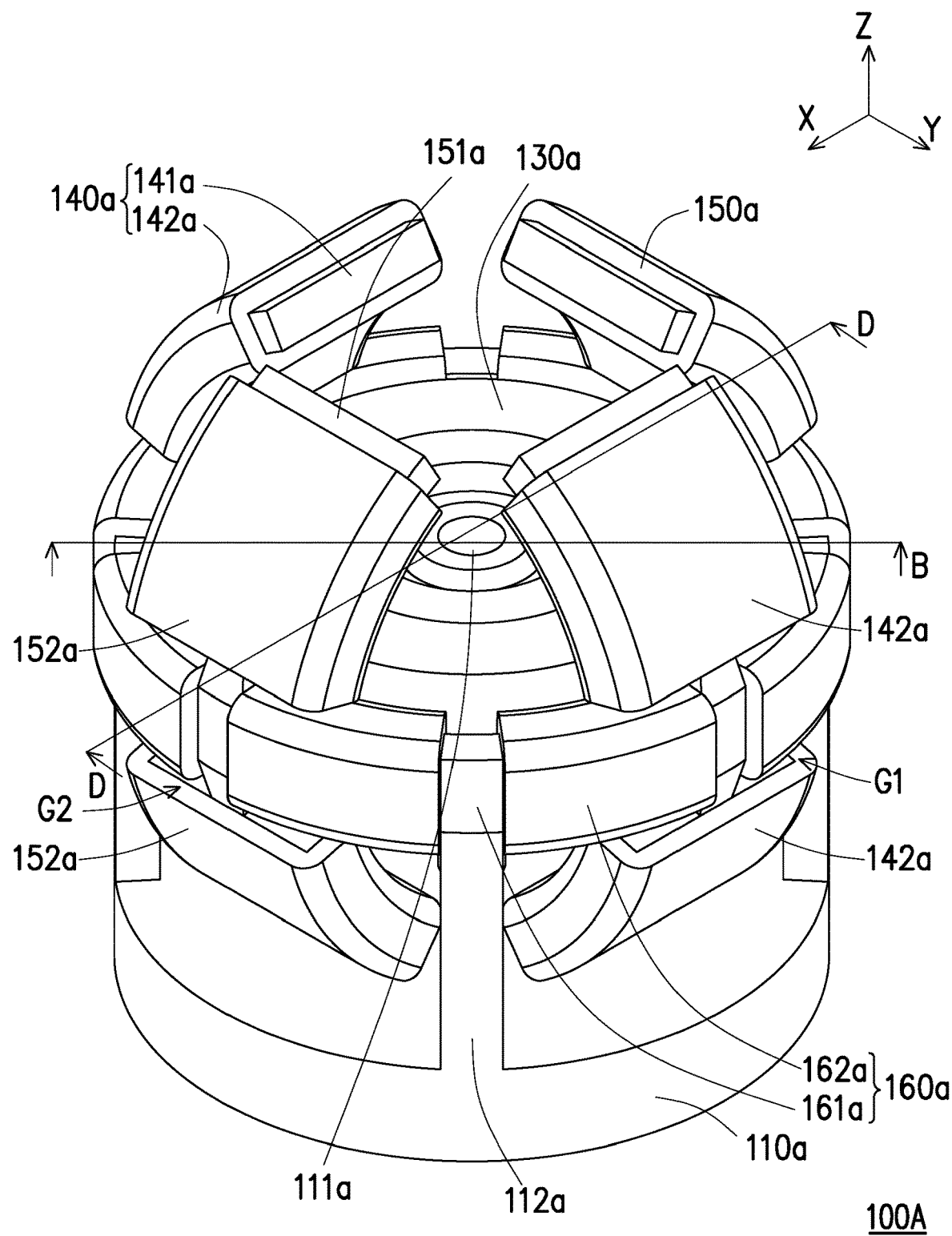
FIG. 3A is a three-dimensional schematic view of a three-axis voice coil motor according to another embodiment of the disclosure.
Figure 3B:
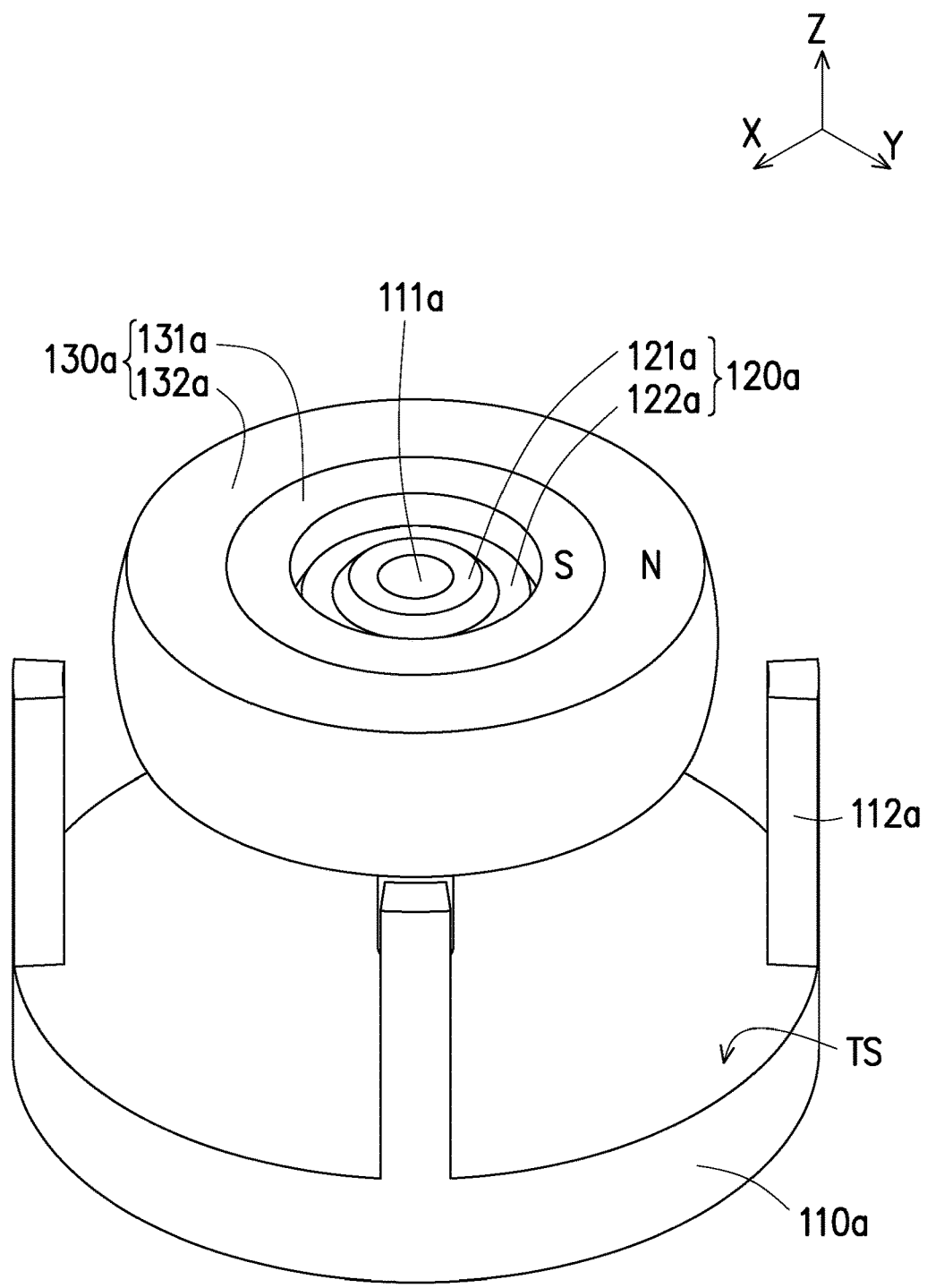
FIG. 3B is a three-dimensional schematic view of some components of the three-axis voice coil motor in FIG. 3A.
Figure 3C:
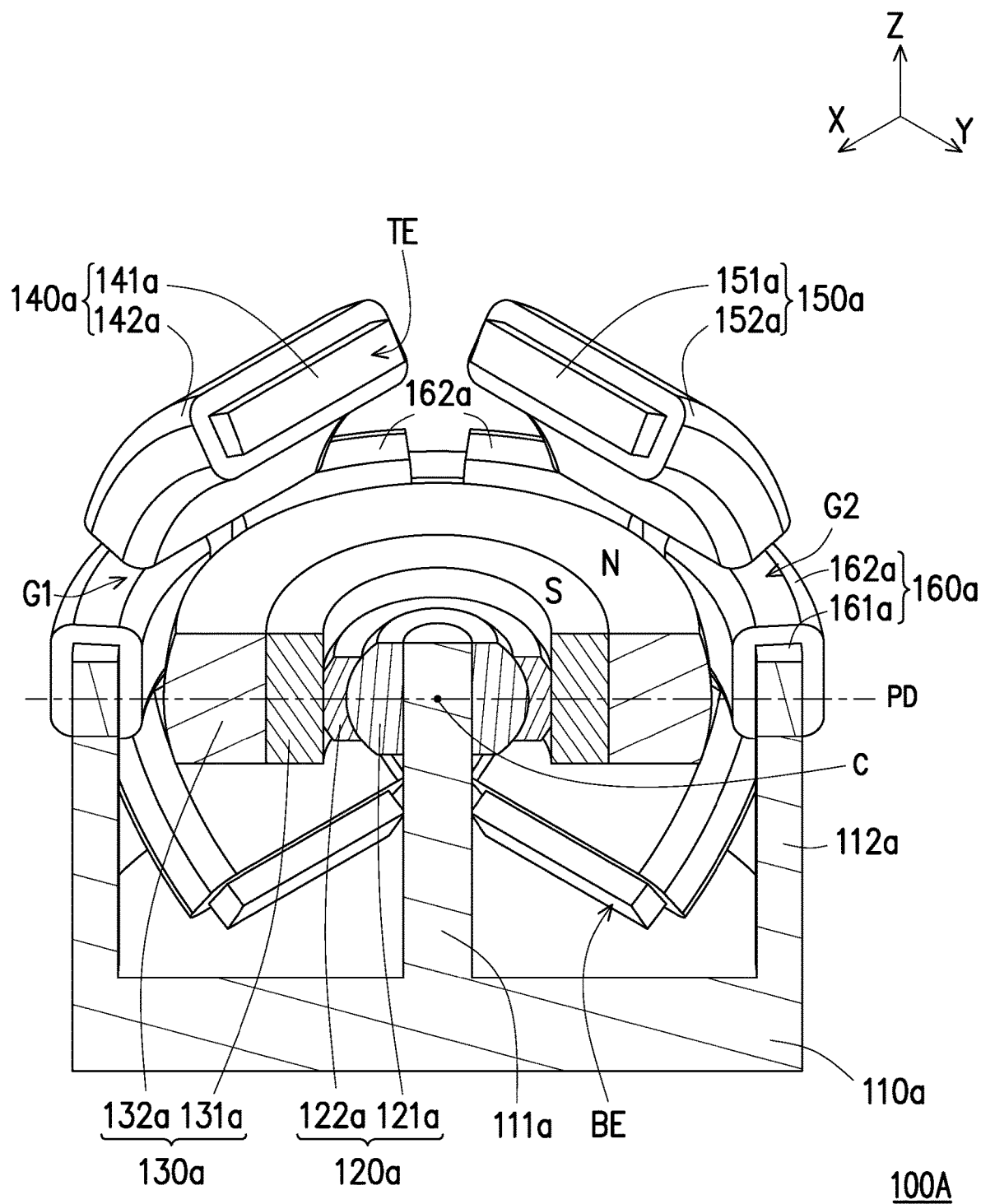
FIG. 3C is a three-dimensional sectional view of the three-axis voice coil motor in FIG. 3A taken along line B-B.
Figure 3D:
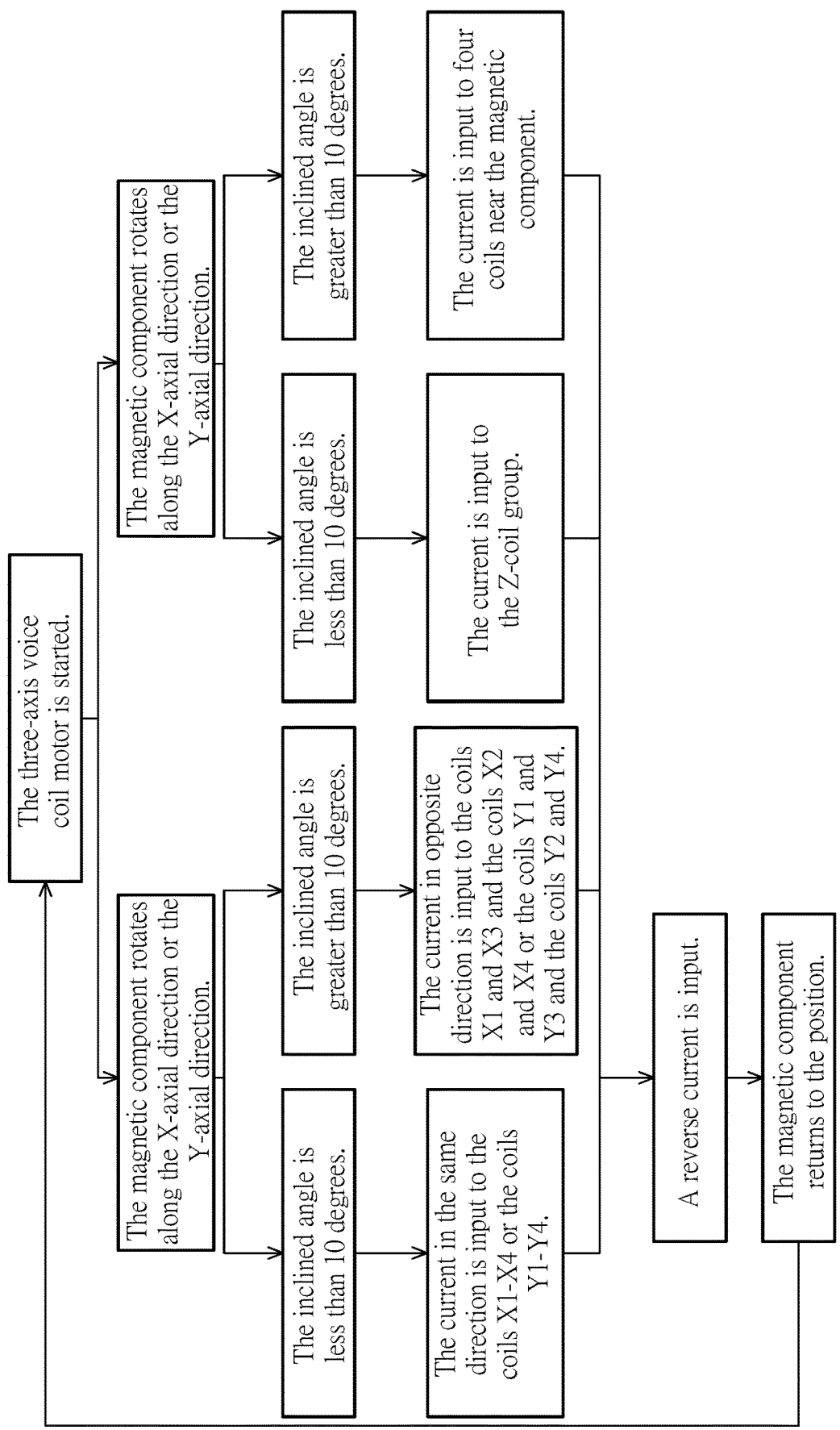
FIG. 3D is a block diagram illustrating the rotation control of the three-axis voice coil motor in FIG. 3A in the X-axial direction, Y-axial direction, or Z-axial direction.

FIG. 3A is a three-dimensional schematic view of a three-axis voice coil motor according to another embodiment of the disclosure. FIG. 3B is a three-dimensional schematic view of some components of the three-axis voice coil motor in FIG. 3A. FIG. 3C is a three-dimensional sectional view of the three-axis voice coil motor in FIG. 3A taken along line B-B. FIG. 3D is a block diagram illustrating the rotation control of the three-axis voice coil motor in FIG. 3A in the X-axial direction, Y-axial direction, or Z-axial direction.

Referring to FIG. 3A to FIG. 3C, a three-axis voice coil motor 100A of the embodiment is different from the three-axis voice coil motor 100A of FIG. 1A. The difference is that a base 110a has multiple support rods 112a disposed around the periphery of a supporting pole 111a and the support rods 112a are connected to at least one Z-coil group 160a. The spherical bearing 120a includes a first ring portion 121a and a second ring portion 122a.

The magnetic component 130a of the embodiment has an inner yoke 131a and a magnetic ring 132a. The inner yoke 131a is sleeved around a second ring portion 122a of a spherical bearing 120a, and the magnetic ring 132a is sleeved around an outer surface OS of the inner yoke 131a.

Referring to FIG. 3A and FIG. 3C, a X-coil group 140a has two first yokes 141a and four X-coils 142a. The two first yokes 141a are suspended on the top surface TS of the base 110a and are disposed on opposite sides of the magnetic component 130a. Two X-coils 142a (X1 and X2) respectively are disposed around a top end TE of the two first yokes 141a. The other two X-coils 142a (X3 and X4) respectively are disposed around a bottom end BE of the two first yokes 141a and are spaced apart from the two X-coils 142a (X1 and X2) to form multiple first gaps G1. The four X-coils 142a are electrically coupled to the two first yokes 141a, respectively.

Referring to FIG. 3A and FIG. 3C, the Y-coil group 150a has two second yokes 151a and four Y-coils 152a. The two second yokes 151a are disposed on the base 110a and are located on opposite sides of the magnetic component 130a. Two Y-coils Y1 and Y2 respectively are disposed around a top end TE of the two second yokes 151a. The other two Y-coils Y3 and Y4 respectively are disposed around a bottom end BE of the two second yokes 151a and are spaced apart from the two Y-coils Y1 and Y2 to form multiple second gaps G2. The four Y-coils 152a are electrically coupled to the two second yokes 151a, respectively. In addition, the Y-coil group 150a and the X-coil group 140a are orthogonal to each other (refer to FIG. 3A and FIG. 3C).

Referring to FIG. 3A and FIG. 3C, at least one Z-coil group 160a has a third yoke 161a and multiple Z-coils 162a. The third yoke 161a is disposed around and between the first gaps G1 and the second gaps G2 and is coupled to the first yokes 141a and the second yokes 151a, and the third yoke 161a is aligned with the magnetic ring 132a of the magnetic component 130a in a horizontal direction PD. Multiple Z-coils 162a are disposed around the third yoke 161a, and each Z-coil 162a partially extends into each first gap G1 or each second gap G2.

Figure 4A:
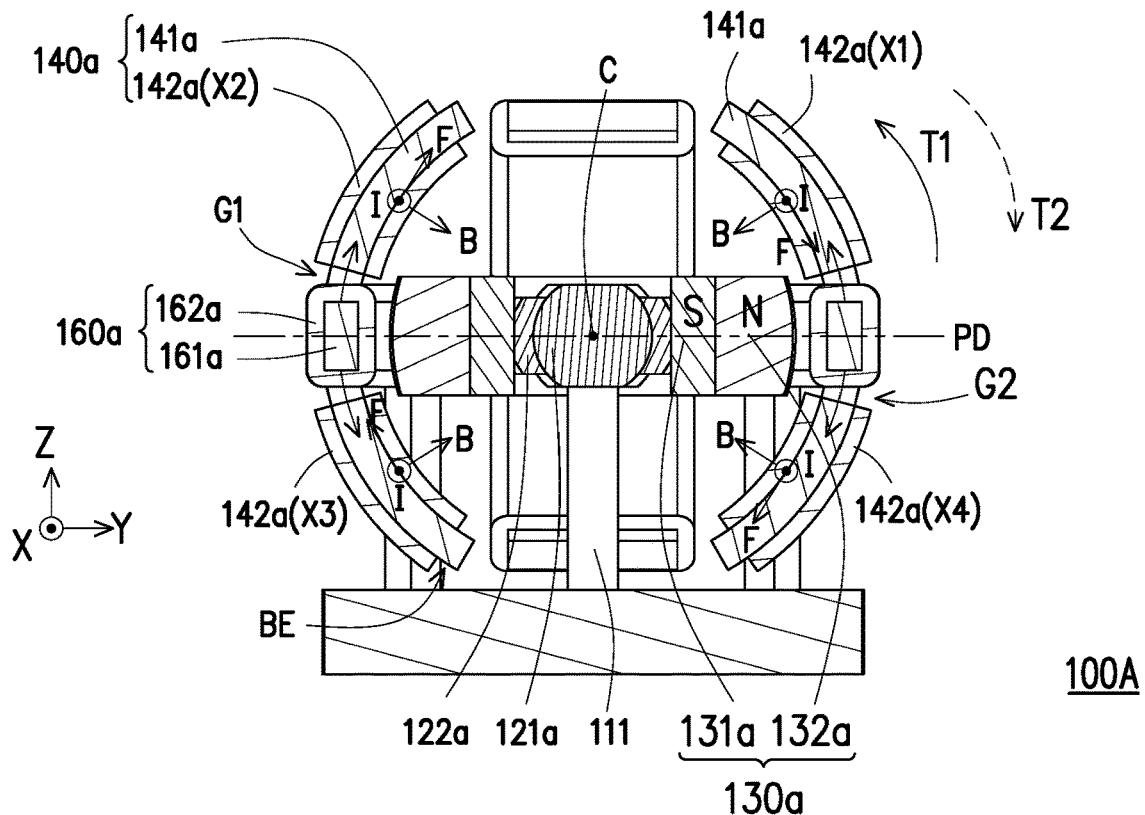
FIG. 4A is a schematic side sectional view of the three-axis voice coil motor in FIG. 3A taken along line B-B.
Figure 4B:
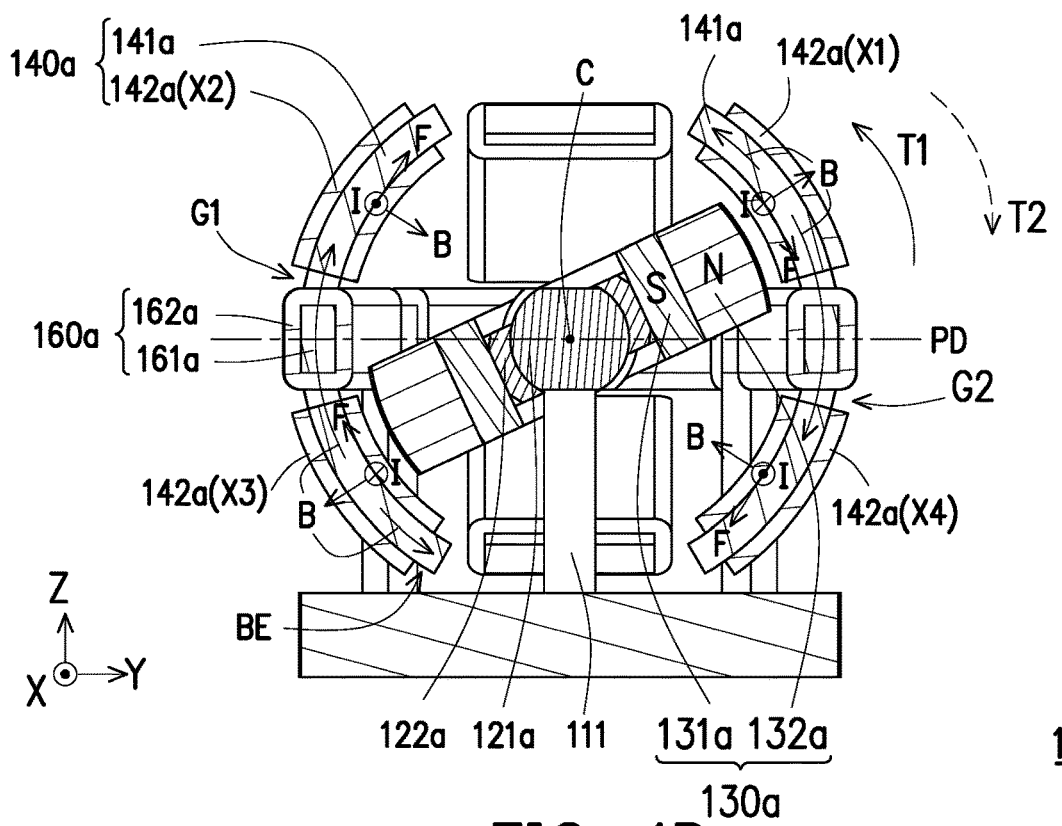
FIG. 4B is a side sectional view illustrating a rotating action of a magnetic component of the three-axis voice coil motor of FIG. 3A along the X-axial direction or Y-axial direction.
Figure 5A:
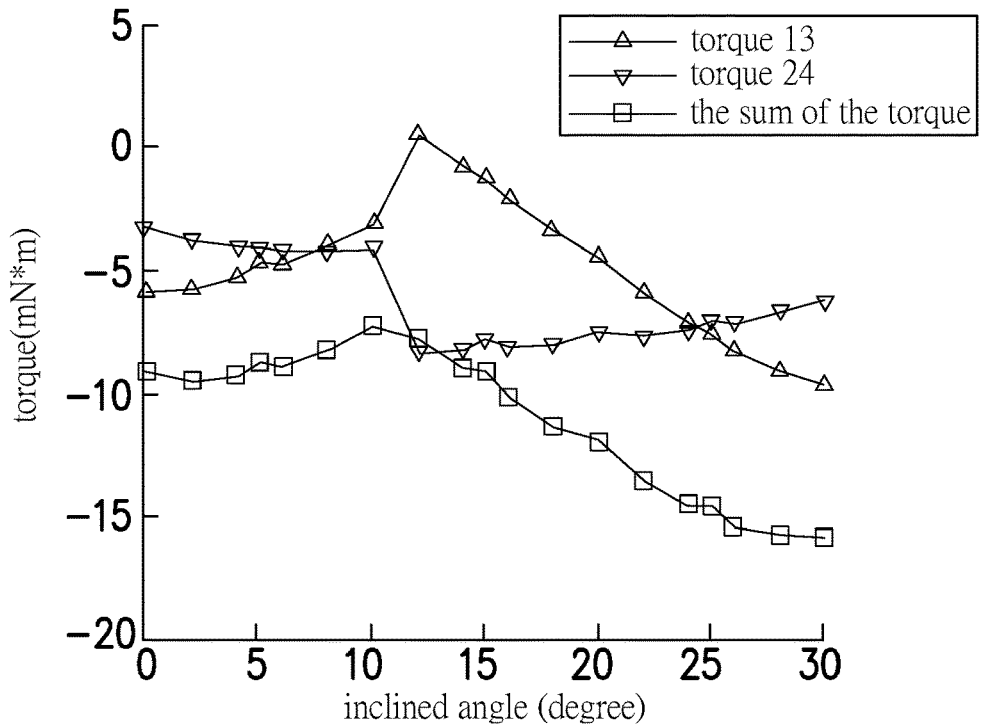
FIG. 5A illustrates the relationship between torque and an inclination angle when the three-axis voice coil motor in FIG. 4A to FIG. 4B rotates along the X-axial direction or the Y-axial direction.

FIG. 4A is a schematic side sectional view of the three-axis voice coil motor in FIG. 3A taken along line B-B. FIG. 4B is a side sectional view illustrating a rotating action of a magnetic component of the three-axis voice coil motor of FIG. 3A along the X-axial direction or Y-axial direction. FIG. 5A illustrates the relationship between torque and an inclination angle when the three-axis voice coil motor in FIG. 4A to FIG. 4B rotates along the X-axial direction or the Y-axial direction.

The rotation control results of the three-axis voice coil motor 100A of the embodiment in the X-axial direction, Y-axial direction, and Z-axial direction are illustrated in the subsequent paragraphs. The three-axis voice coil motor 100A of the embodiment has a symmetrical structure, so the rotation process of the X-axial direction and the Y-axial are the same.

With reference to FIG. 3D and FIG. 4A, when the magnetic component 130a rotates along the X-axial direction or the Y-axial and an inclination angle A relative to the horizontal direction PD is less than 10 degrees (i.e., the rotation stroke of the magnetic component 130a is plus or minus 10 degrees), the current I in the same direction is input into four X-coils 142a or four Y-coils 152a. The magnetic field B of the magnetic component 130a is away from the magnetic ring 132a and is propagated along the first yokes 141a or the second yokes 151a, and the magnetic field B flows back from the two top ends TE and the two bottom ends BE of the first yokes 141a to the center point C of the spherical bearing 120a. Furthermore, the first yokes 141a are used to guide the propagation of the magnetic field B, so that the magnetic field lines are more concentrated and thereby the intensity of the magnetic field B flowing back to the center point C is increased.

Under the action of the four X-coils 142a or the four Y-coils 152a, a Lorentz force F may be generated and torque in the second rotation direction T2 may be formed for the magnetic component 130a. Since the X-coil group 140a or the Y-coil group 150a is a stator, the torque generated by the X-coil group 140a or the Y-coil group 150a in the second rotation direction T2 may drive the magnetic component 130a to rotate in the first rotation direction T1 with the X-axial direction or Y-axial direction as the center. In actual use, the rotational stroke of the magnetic component 130a in the X-axial direction and Y-axial direction ranges between plus and minus 30 degrees.

Referring to FIG. 5A, the magnetic component 130a rotates along the X-axial direction or the Y-axial direction toward the first rotation direction T1, within the rotation range from 0 degrees to 10 degrees, the two X-coils 142a (X2 and X4) or the two Y-coils 152a (Y2 and Y4) generate torque 24 of 3.26-4.06 (mN*m) in the second rotation direction T2, and the other two X-coils 142a (X1 and X3) or the other two Y-coils 152a (Y1 and Y3) generate torque 13 of 3.14-5.83 (mN*m) in the second rotation direction T2.

Referring to FIG. 5A, the sum of the torques in the second rotation direction T2 is 7.2-9.09 (mN*m). This means that the four X-coils 142a (X1-X4) or the four Y-coils 152a (Y1-Y4) have a positive effect on the rotation of the magnetic component 130a in the first rotation direction T1.

Referring to FIG. 3D and FIG. 4B, when the magnetic component 130a rotates along the X-axial direction or the Y-axial direction and an inclination angle A relative to the horizontal direction PD is greater than 10 degrees (i.e., the rotation stroke of the magnetic component 130a exceeds plus or minus 10 degrees), the current I in the opposite direction is input to the four X-coils 142a or the four Y-coils 152a. In the embodiment, a reverse current I is input into two X-coils X1 and X3 (Y-coils Y1 and Y3), and a forward current I is input into the other two X-coils X2, X4 (Y-coils Y2 and Y4).

The magnetic field B of the magnetic component 130a is propagated from the magnetic ring 132a to the two X-coils X1 and X3 of the X-coil group 140a or the Y-coils Y1 and Y3 of the Y-coil group 150a and is propagated along the first yokes 141a or the second yoke 151a, and the magnetic field B flows back from one of the top ends TE and one of the bottom ends BE of the first yokes 141a or the second yokes 151a to the center point C of the spherical bearing 120a.

Under the action of the four X-coils 142a or the four Y-coils 152a, a Lorentz force F may be generated and torque in the second rotation direction T2 may be formed for the magnetic component 130a. Since the X-coil group 140a or the Y-coil group 150a is a stator, the torque generated by the X-coil group 140a or the Y-coil group 150a toward the second rotation direction T2 may drive the magnetic component 130a to rotate in the first rotation direction T1 with the X-axial direction or the Y-axial direction as the center.

Referring to FIG. 5A, the magnetic component 130a rotates along the X-axial direction or the Y-axial direction toward the first rotation direction T1, within the rotation range from 10 degrees to 30 degrees, the two X-coils 142a (X2 and X4) or the two Y-coils 152a (Y2 and Y4) generate torque 24 of 6.2-7.81 (mN*m) in the second rotation direction T2, and the other two X-coils 142a (X1 and X3) or the other two Y-coils 152a (Y1 and Y3) generate torque 13 of 1.28-9.66 (mN*m) in the second rotation direction T2.

Referring to FIG. 5A, the sum of the torques in the second rotation direction T2 is 9.09-15.85 (mN*m). This means that the four X-coils 142a (X1-X4) or the four Y-coils 152a (Y1-Y4) have a positive effect on the rotation of the magnetic component 130a in the first rotation direction T1.

Figure 4C:
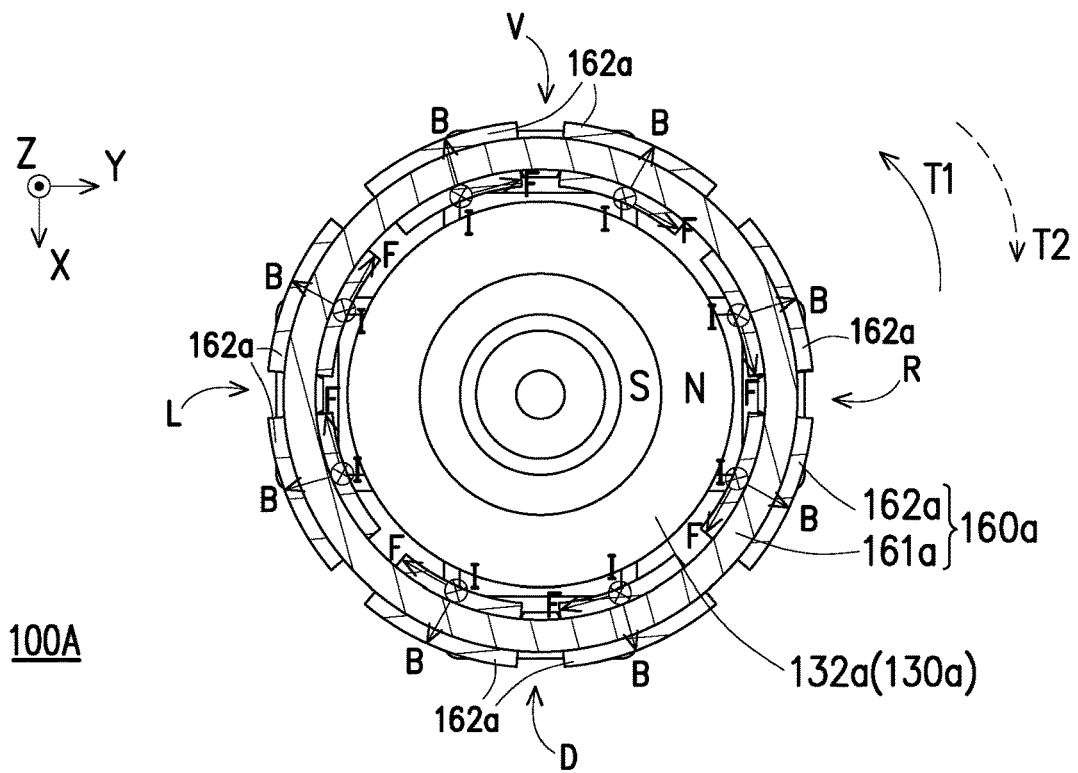
FIG. 4C is a schematic side sectional view illustrating a rotation of a magnetic component of the three-axis voice coil motor of FIG. 4A along the Z-axial direction.
Figure 4D:
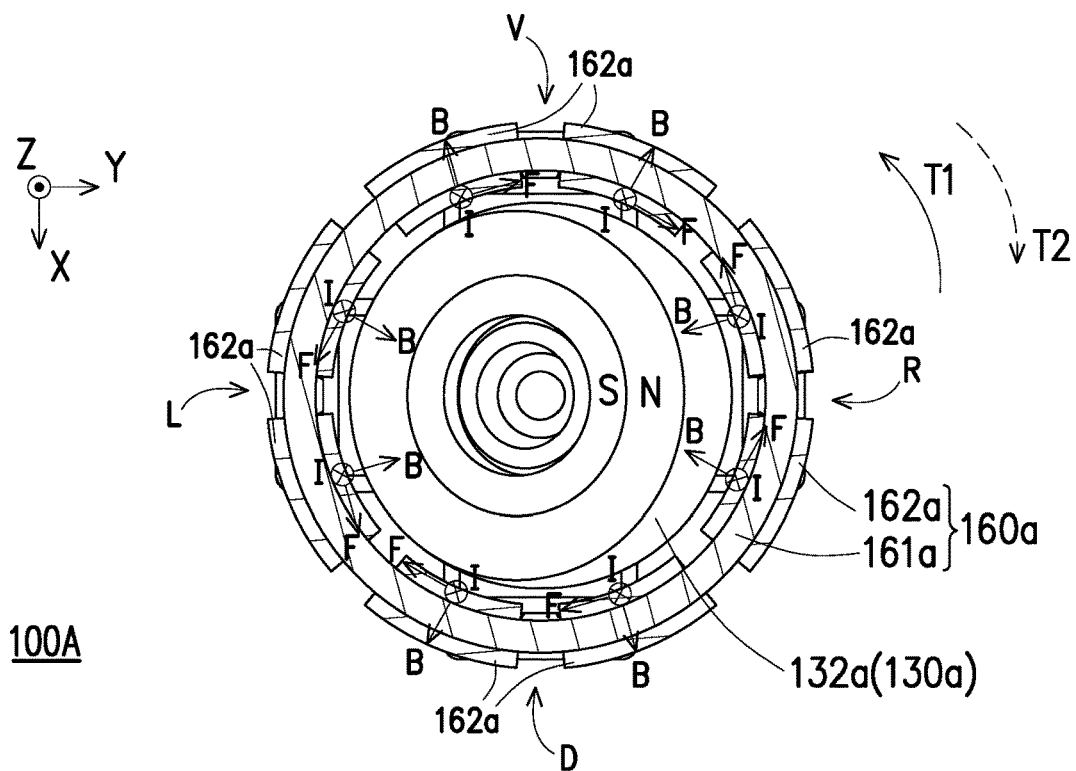
FIG. 4D is a side sectional view illustrating a rotating action of a magnetic component of the three-axis voice coil motor of FIG. 4B rotating along the Z-axial direction.
Figure 5B:
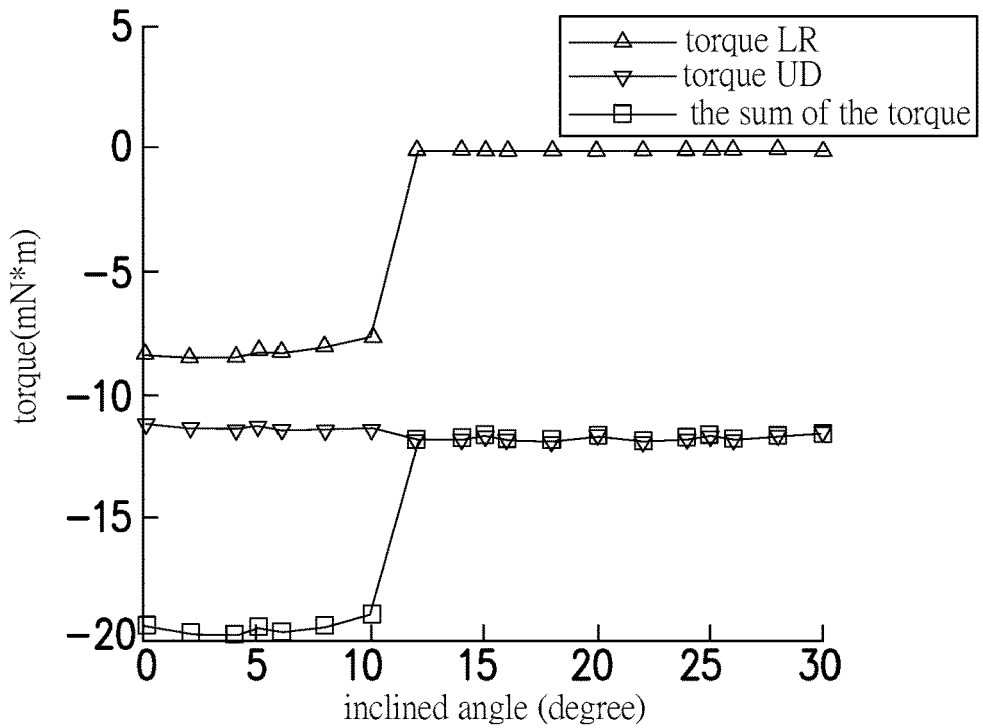
FIG. 5B illustrates the relationship between torque and an inclination angle of the three-axis voice coil motor in FIG. 4C to FIG. 4D rotating along the Z-axial direction.

FIG. 4C is a schematic side sectional view illustrating a rotation of a magnetic component of the three-axis voice coil motor of FIG. 4A along the Z-axial direction. FIG. 4D is a side sectional view illustrating a rotating action of a magnetic component of the three-axis voice coil motor of FIG. 4B rotating along the Z-axial direction. FIG. 5B illustrates the relationship between torque and an inclination angle of the three-axis voice coil motor in FIG. 4C to FIG. 4D rotating along the Z-axial direction.

Referring to FIG. 4A, FIG. 4C, and FIG. 5B, when the magnetic component 130a rotates along the Z-axial direction and an inclination angle of the magnetic ring 132a relative to the horizontal direction PD is less than 10 degrees, the current I in the same direction is input into all the Z-coils 162a, the magnetic field B of the magnetic component 130 is propagated from the magnetic ring 132a to the Z-coils 162a. Under the interaction of the eight Z-coils 162a and the magnetic field B, a Lorentz force F may be generated and torque in the second rotation direction T2 may be formed for the magnetic component 130a. Since the Z-coil group 160a is a stator, the torque of the Z-coil group 160a in the second rotation direction T2 may drive the magnetic component 130a to rotate in the first rotation direction T1 with the Z-axial direction as the center.

Referring to FIG. 5B, the magnetic component 130a rotates along the Z-axial direction toward the first rotation direction T1, within the rotation range from 0 degrees to 10 degrees, the four Z-coils 162a located at the top U and bottom D generate torque UD of 11.14-11.30 (mN*m) in the second rotation direction T2, and the four Z-coils 162a located on the left side L and the right side R generate torque LR of 7.58-8.26 (mN*m) in the second rotation direction T2.

Referring to FIG. 5B, the sum of the torques in the second rotation direction T2 is 18.89-19.43 (mN*m). This means that when an inclined angle of the magnetic component 130a is less than 10 degrees relative to the horizontal direction PD, the eight Z-coils 162a disposed around the magnetic component 130a have a positive effect on the rotation of the magnetic component 130a in the first rotation direction T1.

On the contrary, changing the direction in which the current I is input to the Z-coils 162a can drive the magnetic component 130a to rotate in the second rotation direction T2 with the Z-axial direction as the center. In actual use, the rotation stroke of the magnetic component 130a in the Z-axial direction is 360 degrees.

Referring to FIG. 4B, FIG. 4D, and FIG. 5B, when the magnetic component 130a rotates along the Z-axial direction and an inclination angle of the magnetic ring 132a relative to the horizontal direction PD is greater than 10 degrees, the current I in the same direction is input into part of the Z-coils 162a (located at the upper U and the bottom D) near the magnetic ring 132a, and no current I is input into part of the Z-coils 162a (located on the left side L and right side R) far away from the magnetic ring 132a. The magnetic field B of the magnetic component 130a is propagated to four Z-coils 162a (located at the upper U and bottom D) near the magnetic ring 132a. Since no current I is input into the Z-coils 162a (located on the left side L and right side R) far away from the magnetic ring 132a, under the action of the Z-coils 162a (located at the upper U and bottom D), a Lorentz force F may be generated and torque in the second rotation direction T2 may be formed for the magnetic component 130a. Since the Z-coil group 160a is a stator, the torque of the Z-coil group 160a in the second rotation direction T2 may drive the magnetic component 130a to rotate in the first rotation direction T1 with the Z-axial direction as the center.

Referring to FIG. 4D, in addition, the magnetic field B of the magnetic component 130a is propagated from the other four Z-coils 162a (located on the left side L and right side R) away from the magnetic ring 132a toward the magnetic ring 132a of the magnetic component 130a. Alternatively, in the embodiment, no current is input into the four Z-coils 162a located on the left side L and the right side R since after the four Z-coils 162a are powered on, the magnetic field is reduced, and an external force in the opposite direction may be generated for the magnetic component 130a.

Referring to FIG. 5B, the magnetic component 130a rotates along the Z-axial direction toward the first rotation direction T1, within the rotation range from 10 degrees to 30 degrees, the four Z-coils 162a at the upper U and the bottom D generate torque UD of 11.49-11.63 (mN*m) in the second rotation direction T2, and the four Z-coils 162a at the left side L and right side R do not generate torque because no current I is input. This means that when the inclined angle of the magnetic component 130a is greater than 10 degrees relative to the horizontal direction PD, there is no need to input current into the four Z-coils 162a at the left side L and the right side R, and power can be saved.

Figure 6:
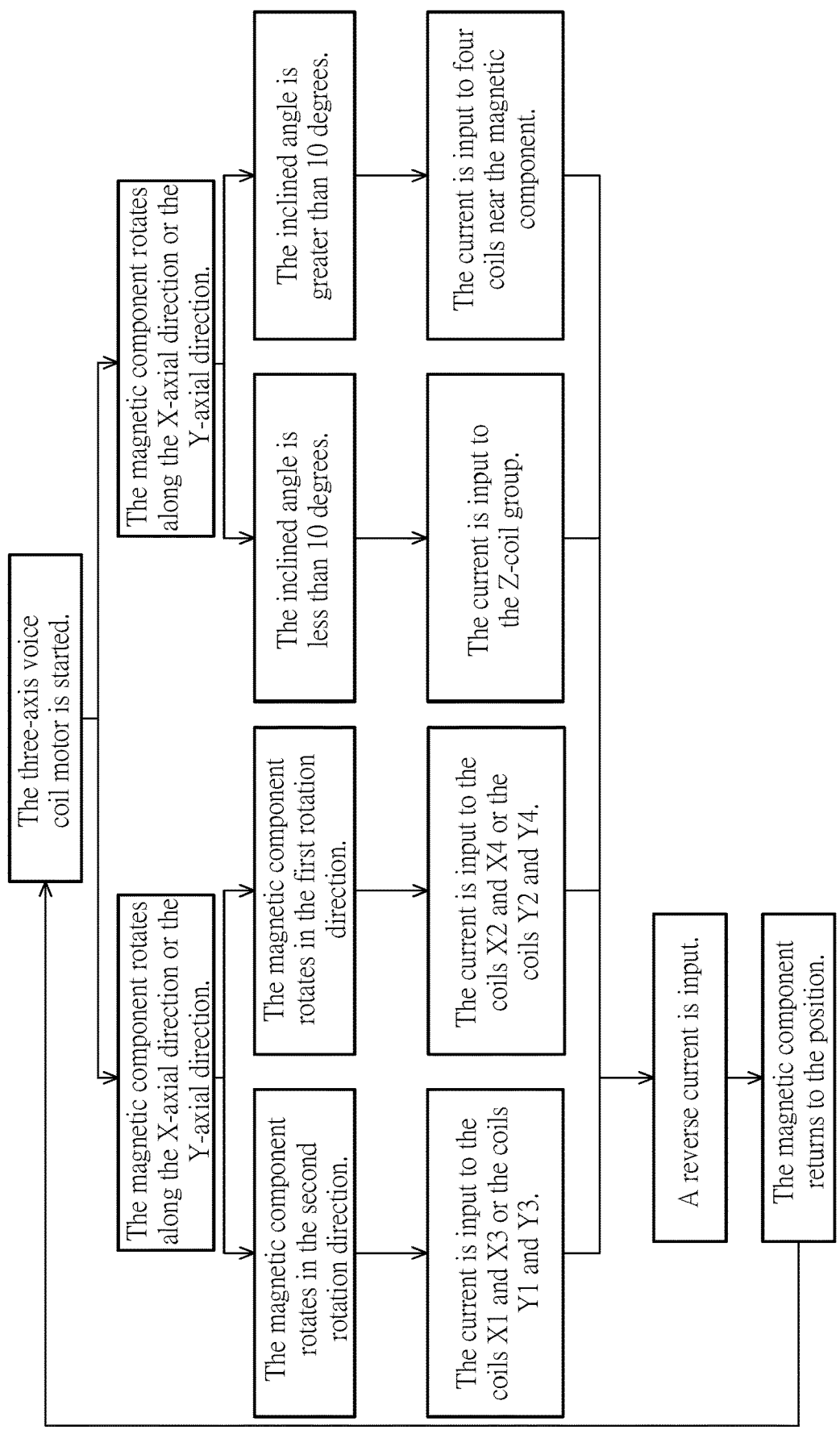
FIG. 6 is a block diagram of another rotation control of the three-axis voice coil motor of FIG. 3A in the X-axial direction, Y-axial direction, or Z-axial direction.

FIG. 6 is a block diagram of another rotation control of the three-axis voice coil motor of FIG. 3A in the X-axial direction, Y-axial direction, or Z-axial direction.

With reference to FIG. 4A, FIG. 4B, and FIG. 6, when the magnetic component 130a rotates along the X-axial direction or the Y-axial direction toward the first rotation direction T1, the current I is only input to the corresponding two X-coils 142a (X2 and X4) or two Y-coils 152a (Y2 and Y4).

Under the action of the two X-coils 142a (X2 and X4) or the two Y-coils 152a (Y2 and Y4), a Lorentz force F may be generated and torque in the second rotation direction T2 may be formed for the magnetic component 130a. Since the X-coil group 140a or the Y-coil group 150a is a stator, the torque generated by the X-coil group 140a or the Y-coil group 150a in the second rotation direction T2 may drive the magnetic component 130a to rotate in the first rotation direction T1 with the X-axial direction or Y-axial direction as the center.

Referring to FIG. 5A, the magnetic component 130a rotates along the X-axial direction or Y-axial direction toward the first rotation direction T1, within the rotation range from 0 degrees to 30 degrees, and two X-coils 142a (X2 and X4) or two Y-coils 152a (Y2 and Y4) may generate torque 13 in the second rotation direction T2.

In the embodiment, the current I is only input to the corresponding two X-coils 142a (X2 and X4) or two Y-coils 152a (Y2 and Y4) to achieve the effect of power saving.

On the contrary, the current I is input into the corresponding other two corresponding X-coils 142a (X1 and X3) or the other two Y-coils 152a (Y1 and Y3) to drive the magnetic component 130a to rotate in the second rotation direction T2 opposite to the first rotation direction T1 with the X-axial direction or Y-axial as the center.

Referring to FIG. 6, when the inclination angle is greater than 10 degrees, power may not be supplied to part of the X-coil group or part of the Y-coil group away from the magnetic component, and the effect of power saving is achieved. In detail, the three-axis voice coil motor of the embodiment is adapted for being powered on where the magnetic field strength is high in the X-coil group and the Y-coil group, and not being powered on where the magnetic field is low in the X-coil group and the Y-coil group.

Figure 7B:
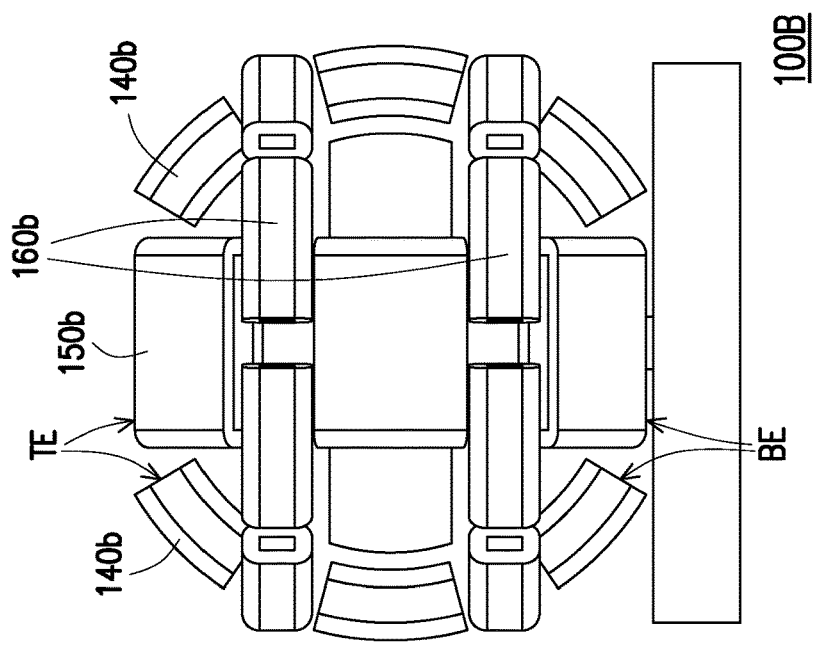
FIG. 7B is a schematic side plan view of the three-axis voice coil motor of FIG. 7A.
Figure 7A:
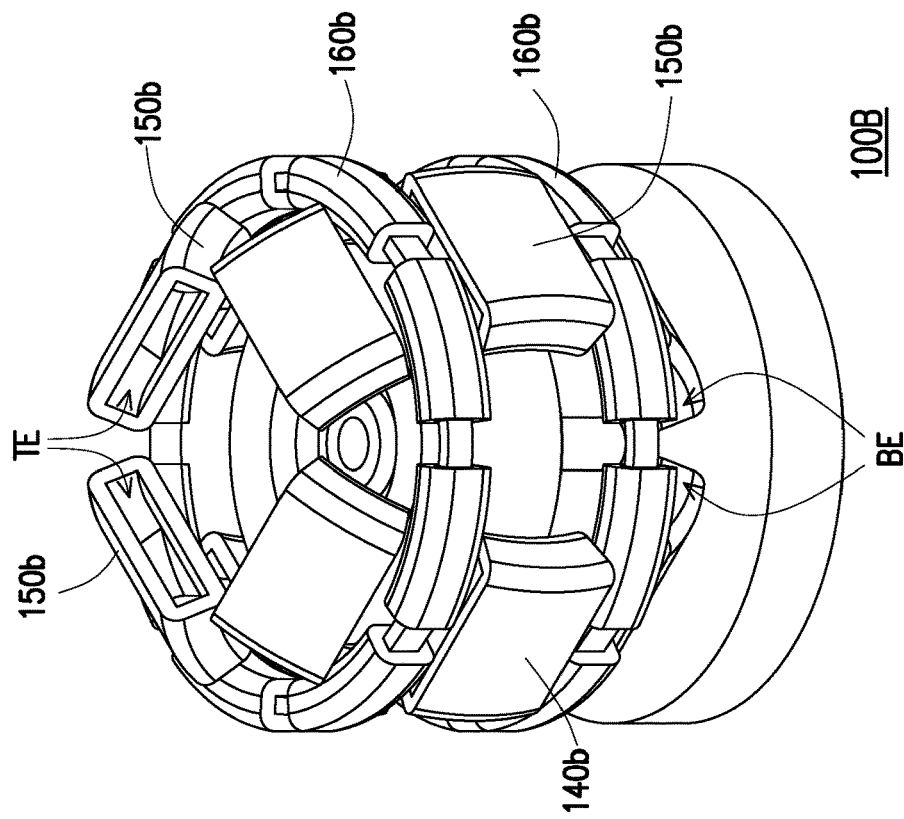
FIG. 7A is a three-dimensional schematic view of a three-axis voice coil motor having multiple Z-coil groups according to another embodiment of the disclosure.

FIG. 7A is a three-dimensional schematic view of a three-axis voice coil motor having multiple Z-coil groups according to another embodiment of the disclosure. FIG. 7B is a schematic side plan view of the three-axis voice coil motor of FIG. 7A.

Referring to FIG. 7A and FIG. 7B, a three-axis voice coil motor 100B of the embodiment is different from the three-axis voice coil motor 100A of FIG. 3A. The difference is that the number of at least one Z-coil group 160b may be plural (e.g., two), and the two Z-coil groups 160b is disposed around the magnetic component 130b along the Z-axial direction and divides the X-coil group 140b and the Y-coil group 150b. In the embodiment, the two Z-coil groups 160b are respectively close to the top end TE and the bottom end BE of the X-coil group 140b and the Y-coil group 150b.

In other embodiments, each Z-coil group is divided at a diagonal line between the X-coil group and the Y-coil group, for example.

Figure 8B:
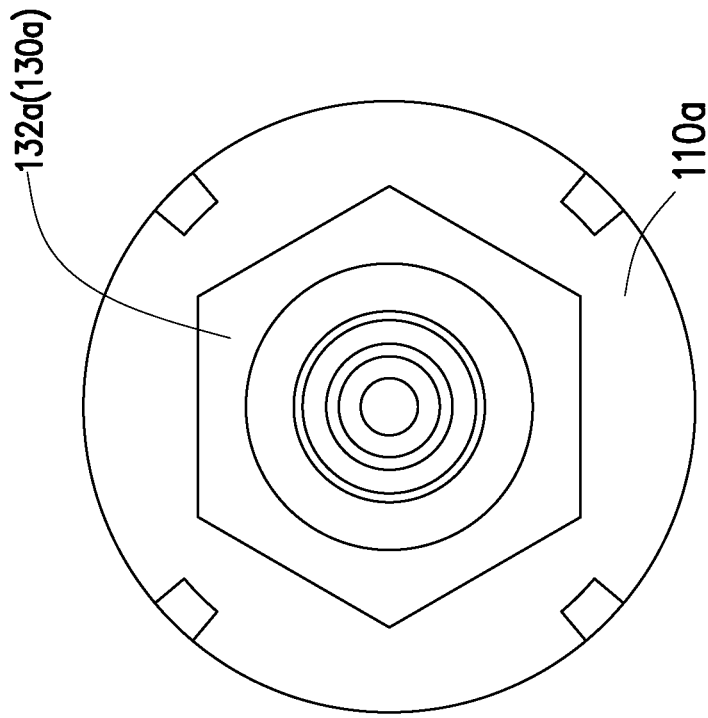
FIG. 8B is a schematic top plan view of the magnetic component of FIG. 8A according still another embodiment.
Figure 8A:
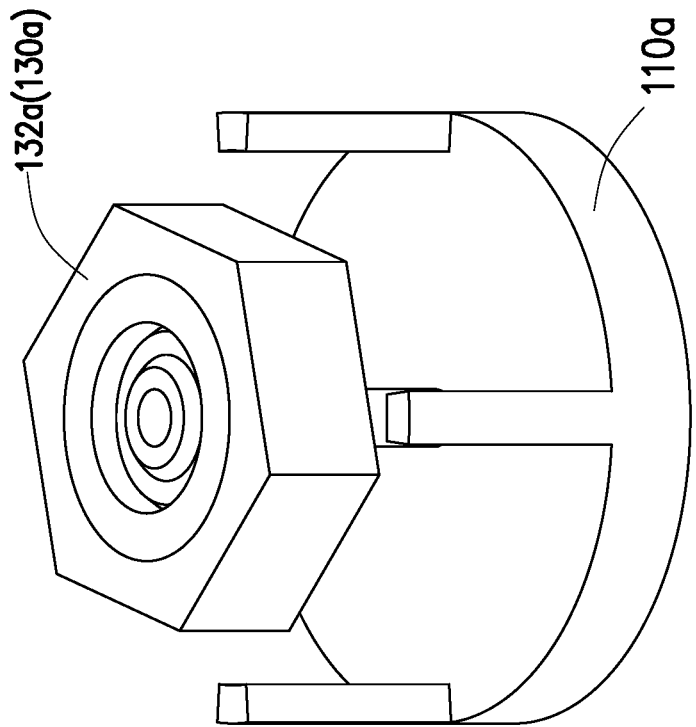
FIG. 8A is a three-dimensional schematic view of a three-axis voice coil motor adopting another magnetic component according to still another embodiment of the disclosure.

FIG. 8A is a three-dimensional schematic view of a three-axis voice coil motor adopting another magnetic component according to still another embodiment of the disclosure. FIG. 8B is a schematic top plan view of the magnetic component of FIG. 8A according still another embodiment.

Referring to FIG. 8A and FIG. 8B, the magnetic ring 132a of the embodiment has a closed structure such as a cylindrical triangle, a quadrilateral, or a hexagon, so that after the Z-coil group 160a is powered on, the magnetic field B generated by the magnetic ring 132a of the magnetic component 130a can be evenly distributed in each Z-coil 162a (refer to FIG. 4C), and thereby torque is generated to drive the magnetic component to rotate 360 degrees in the Z-axial direction.

In summary, the three-axis voice coil motor of the disclosure adopts an X-coil group and a Y-coil group that are divided, which have a first gap and a second gap, respectively. The X-coil group and the Y-coil group are adapted for increasing the Laurent force generated by the interaction of the X-coil group and the Y-coil group with the magnetic field of the magnetic component after being powered on through different power supply arrangements along with the magnetic field propagation of the magnetic component, and thereby the rotation speed of the magnetic component is increased.

Furthermore, the three-axis voice coil motor of another embodiment of the disclosure adopts a magnetic ring with an annular closed structure, which is adapted for corresponding to multiple Z-coils of the Z-coil group in 360 degrees, so that after the Z-coil group is powered on, the magnetic field generated by the magnetic component can be evenly distributed in each Z-coil, and thereby torque is generated to drive the magnetic component to achieve a 360-degree rotation in the Z-axial direction.

What is claimed is:

1. A three-axis voice coil motor, comprising:
    a base with a supporting pole;
    a spherical bearing rotatably sleeved around the supporting pole;
    a magnetic component securely sleeved around the spherical bearing and rotating with the spherical bearing;
    an X-coil group disposed around the magnetic component along an X-axial direction passing through the spherical bearing, wherein the X-coil group comprises a plurality of first gaps;
    a Y-coil group disposed around the magnetic component along a Y-axial direction passing through the spherical bearing, wherein the Y-coil group comprises a plurality of second gaps; and
    at least one Z-coil group disposed around the magnetic component along a Z-axial direction passing through the spherical bearing,
    wherein when a current is input to the X-coil group, the Y-coil group, or the at least one Z-coil group and a magnetic field of the magnetic component is propagated to the X-coil group, the Y-coil group, or the at least one coil group, a corresponding Lorentz force may be generated to drive the magnetic component to rotate along the X-axial direction, the Y-axial direction, or the Z-axial direction on the spherical bearing,
    wherein the spherical bearing comprises a first ring portion and a second ring portion, the first ring portion is securely sleeved around the supporting pole, the second ring portion is rotatably sleeved around the first ring portion, and the second ring portion is adapted to rotate relative to the first ring portion to drive the magnetic component to rotate relative to the X-coil group, the Y-coil group, or the Z-coil group,
    wherein the base comprises a plurality of support rods disposed around a periphery of the supporting pole, and the support rods are connected to the at least one Z-coil group.

2. The three-axis voice coil motor of claim 1, wherein the magnetic component comprises an inner yoke and a plurality of magnetic blocks, the inner yoke is securely sleeved around the second ring portion, and the magnetic blocks are disposed around an outer surface of the inner yoke.

3. The three-axis voice coil motor of claim 2, wherein the X-coil group comprises two first yokes and four X-coils, the two first yokes are disposed on the base and located on opposite sides of the magnetic component, two of the X-coils respectively are disposed around a top end of the two first yokes, and the other two of the X-coils respectively are disposed around a bottom end of the two first yokes and are spaced apart from the two of the X-coils to form a plurality of first gaps.

4. The three-axis voice coil motor of claim 3, wherein the Y-coil group comprises two second yokes and four Y-coils, the two second yokes are disposed on the base and located on opposite sides of the magnetic component, two of the Y-coils respectively are disposed around a top end of the two second yokes, and the other two of the Y-coils respectively are disposed around a bottom end of the two second yokes and are spaced apart from two of the Y-coils respectively to form a plurality of second gaps.

5. The three-axis voice coil motor of claim 4, wherein the at least one Z-coil group comprises four third yokes and four Z-coils, the third yokes are disposed in alignment on the base and coupled to one another, each of the third yokes is located between each of the first yokes and each of the second yokes, and each of the Z-coils is disposed around each of the third yokes and is located between each of the first gaps and each of the second gaps.

6. The three-axis voice coil motor of claim 4, wherein when the magnetic component rotates along the X-axial direction or the Y-axial direction, the current is input to the corresponding two of the X-coils or two of the Y-coils, and the magnetic field of the magnetic component is propagated along the corresponding X-coil groups toward a central point of the magnetic component, or the magnetic field of the magnetic component passes through the corresponding Y-coil groups and is away from the central point.

7. The three-axis voice coil motor of claim 1, wherein the magnetic component comprises an inner yoke and a magnetic ring, the inner yoke is securely sleeved around the second ring portion, and the magnetic ring is sleeved around an outer surface of the inner yoke.

8. The three-axis voice coil motor of claim 7, wherein the X-coil group comprises two first yokes and four X-coils, the two first yokes are disposed suspensively to the base and located on opposite sides of the magnetic component, two of the X-coils respectively are disposed around a top end of the two first yokes, and the other two of the X-coils respectively are disposed around a bottom end of the two first yokes and are spaced apart from the two of the X-coils to form a plurality of first gaps.

9. The three-axis voice coil motor of claim 8, wherein the Y-coil group comprises two second yokes and four Y-coils, the two second yokes are disposed suspensively to the base and located on opposite sides of the magnetic component, two of the Y-coils respectively are disposed around a top end of the two second yokes, and the other two of the Y-coils respectively are disposed around a bottom end of the two second yokes and are spaced apart from two of the Y-coils respectively to form a plurality of second gaps.

10. The three-axis voice coil motor of claim 9, wherein the at least one Z-coil group comprises a third yoke and a plurality of Z-coils, the third yoke is disposed around and between the first gaps and the second gaps and is coupled to the first yokes and the second yokes, the Z-coils are disposed around the third yoke, and part of each of the Z-coils extends to each of the first gaps or each of the second gaps.

11. The three-axis voice coil motor of claim 9, wherein when the magnetic component rotates along the X-axial direction or the Y-axial direction and an inclination angle relative to a horizontal direction is less than 10 degrees, the current in the same direction is input to the X-coils or the Y-coils, so that the magnetic field of the magnetic component is far away from the magnetic ring and is propagated along the first yokes or the second yokes, and the magnetic field flows back from the two top ends and the two bottom ends of the first yokes or the second yokes to a center point of the spherical bearing.

12. The three-axis voice coil motor of claim 9, wherein when the magnetic component rotates along the X-axial direction or the Y-axial direction and an inclination angle relative to a horizontal direction is greater than 10 degrees, the current in the opposite direction is input to the X-coils or the Y-coils, so that the magnetic field of the magnetic component is far away from the magnetic ring and is propagated along the first yokes or the second yokes, and the magnetic field flows back from one of the top ends and one of the bottom ends of the first yokes or the second yokes to a center point of the spherical bearing.

13. The three-axis voice coil motor of claim 9, wherein when the magnetic component rotates along the X-axial direction or the Y-axial direction, the current is input to the corresponding two of the X-coils or two of the Y-coils, and the magnetic field of the magnetic component is propagated from the magnetic ring to the X-coil group or the Y-coil group and then flows back from the X-coil group or the Y-coil group to a center point of the spherical bearing.

14. The three-axis voice coil motor of claim 10, wherein when the magnetic ring of the magnetic component rotates along the Z-axial direction and an inclination angle relative to a horizontal direction is less than 10 degrees, the current is input to the Z-coils, and the magnetic field of the magnetic component is propagated from the magnetic ring to the Z-coils.

15. The three-axis voice coil motor of claim 10, wherein when the magnetic ring of the magnetic component rotates along the Z-axial direction and an inclination angle relative to a horizontal direction is greater than 10 degrees, the current is input to part of the Z-coils near the magnetic ring, the magnetic field of the magnetic component is propagated to the part of the Z-coils near the magnetic ring, and the magnetic field of the magnetic component is propagated from another part of the Z-coils away from the magnetic ring toward the magnetic ring.

16. The three-axis voice coil motor of claim 10, wherein when the magnetic ring of the magnetic component rotates along the Z-axial direction and an inclination angle relative to a horizontal direction is greater than 10 degrees, the current is input to part of the Z-coils near the magnetic ring.

17. The three-axis voice coil motor of claim 7, wherein the magnetic ring comprises a cylinder, a triangle, a quadrilateral, or a hexagon.

18. The three-axis voice coil motor of claim 1, wherein a number of the at least one Z-coil group is plural, and each of the Z-coil groups is disposed around the magnetic component along the Z-axial direction and divides the X-coil group and the Y-coil group.

* * * * *